United States Patent
Vaish et al.

(10) Patent No.: US 12,033,139 B2
(45) Date of Patent: Jul. 9, 2024

(54) COMPUTER IMPLEMENTED SYSTEM AND METHOD FOR COLLECTING, TRADING, CRAFTING NON-FUNGIBLE DIGITAL TOKENS, AND PLAYING FANTASY GAME USING SAID NON-FUNGIBLE DIGITAL TOKENS

(71) Applicants: Ritika Chatterjee, Karnataka (IN); Arunav Vaish, Maharashtra (IN)

(72) Inventors: Arunav Vaish, Maharashtra (IN); Ridhima Bahl, Uttar Pradesh (IN); Varun Chopra, Gujarat (IN); Shubham Kukreja, Maharashtra (IN); Atharv Chavan, Maharashtra (IN)

(73) Assignee: M-League LTD., Singapore (SG)

( * ) Notice: Subject to any disclaimer, the term of this patent is extended or adjusted under 35 U.S.C. 154(b) by 206 days.

(21) Appl. No.: 17/832,913

(22) Filed: Jun. 6, 2022

(65) Prior Publication Data
US 2023/0177492 A1 Jun. 8, 2023

(30) Foreign Application Priority Data
Dec. 2, 2021 (IN) .............................. 202141055933

(51) Int. Cl.
| | |
|---|---|
| G06Q 20/36 | (2012.01) |
| A63F 13/60 | (2014.01) |
| A63F 13/71 | (2014.01) |
| H04L 9/00 | (2022.01) |

(Continued)

(52) U.S. Cl.
CPC ......... *G06Q 20/3678* (2013.01); *A63F 13/60* (2014.09); *A63F 13/71* (2014.09); *H04L 9/3213* (2013.01); *H04L 9/50* (2022.05); *A63F 2300/55* (2013.01); *A63F 2300/80* (2013.01); *G06Q 2220/00* (2013.01); *G07F 17/3272* (2013.01)

(58) Field of Classification Search
CPC ...................... G06Q 20/3678; G06Q 2220/00; A63F 13/60; A63F 13/71; A63F 2300/55; A63F 2300/80; H04L 9/50; H04L 9/3213; G07F 17/3272
USPC ........................................................... 463/3
See application file for complete search history.

(56) References Cited

U.S. PATENT DOCUMENTS

| | | | |
|---|---|---|---|
| 8,523,648 B2 | 9/2013 | Gilson et al. | |
| 10,537,807 B2 * | 1/2020 | Farudi | ................... H04L 9/3239 |
| 10,751,628 B2 * | 8/2020 | Packin | ................... H04L 9/3239 |

(Continued)

*Primary Examiner* — Allen Chan
(74) *Attorney, Agent, or Firm* — United IP Law, LLC

(57) ABSTRACT

The present invention provides a system for trading and crafting the said non-fungible digital tokens, and playing a fantasy game using the non-fungible digital tokens, over a computer network. The system includes a blockchain network including a register for storing information related to the non-fungible digital tokens. The system further includes a minting module configured to mint the tokens. Further, the system includes a bundle generator module configured to generate bundles of the minted tokens. The system further includes a fantasy application that includes a trading module facilitates the users to buy and sell the tokens. The application further includes a crafting module that is configured to facilitate the users to craft the tokens of higher rarity using the tokens of lower rarity. The application includes a fantasy team generator module for allowing the users to create a fantasy team using said tokens and play the fantasy game.

30 Claims, 17 Drawing Sheets

(51) Int. Cl.
  *H04L 9/32* (2006.01)
  *G07F 17/32* (2006.01)

(56) References Cited

U.S. PATENT DOCUMENTS

| | | | |
|---|---|---|---|
| 11,069,196 B2* | 7/2021 | Warren | G06Q 50/34 |
| 11,494,737 B2* | 11/2022 | Fowler | G06F 16/23 |
| 11,786,820 B2* | 10/2023 | Meyers | A63F 13/60 |
| | | | 463/42 |
| 11,865,459 B1* | 1/2024 | Leondires | A63F 13/792 |
| 2003/0054885 A1 | 3/2003 | Pinto et al. | |
| 2009/0039601 A1 | 2/2009 | Carpe | |
| 2015/0278963 A1* | 10/2015 | Nishimine | H04L 67/1095 |
| | | | 705/14.31 |

* cited by examiner

|  | Most common | | | Rare | | | Most rare | |
| --- | --- | --- | --- | --- | --- | --- | --- | --- |
| Common | Wickets | Maidens | Economy | 3W haul | 4W haul | 5W haul | Hat-trick | 10W |
|  |  |  |  |  |  |  |  |  |
|  |  |  |  |  |  |  |  |  |
|  | 200 |  |  |  |  |  |  |  |
|  | 300 |  |  |  |  | 5 |  |  |
|  | 400 |  |  |  | 10 | 10 |  |  |
|  | 500 |  |  |  | 20 | 15 |  |  |
|  | 600 |  |  |  | 30 | 20 |  |  |
| Rare | 100 x |  |  |  | 10 x | 5 x |  |  |

Fig. 4A

|  | Most common | | | Rare | | | Most rare | |
| --- | --- | --- | --- | --- | --- | --- | --- | --- |
| Common | Wickets | Maidens | Economy | 3W haul | 4W haul | 5W haul | Hat-trick | 10W |
|  |  |  |  |  |  |  |  |  |
|  |  |  |  |  |  |  |  |  |
|  | 200 |  |  |  |  |  |  |  |
|  | 300 |  |  |  |  | 5 |  |  |
|  | 400 |  |  |  | 10 | 10 |  |  |
|  | 500 |  |  |  | 20 | 15 |  |  |
|  | 600 |  |  |  | 30 | 20 |  |  |
| Rare | 100 x |  |  |  | 10 x | 5 x |  |  |

Fig. 4B

| Positive Records | | | | | |
|---|---|---|---|---|---|
| | Runs | Score | Most | Highest | Consecutive |
| Common | | | | | |
| | | | | | |
| | | 50 | | | |
| | 3000 | 100 | | | |
| | 4000 | 150 | No. of half centuries | | |
| | 5000 | 200 | No. of centuries | Avg (Overall) | |
| Rare | 6000 | 250 | No. of 150s | No. of man of the match | 100 |
| | 1000 x | 50 x | No. of 200s | Score in ODI | 150 |

Fig. 5A

| Negative Records | | |
|---|---|---|
| | Most | Consecutive |
| Common | | |
| | | |
| | | |
| | | |
| | | |
| | No. of bowled | |
| | No. of ducks | Ducks |
| | No. of diamond ducks | Runouts |
| Rare | Hit wickets | Hit wickets |

Fig. 5B

COMPUTER IMPLEMENTED SYSTEM AND METHOD FOR COLLECTING, TRADING, CRAFTING NON-FUNGIBLE DIGITAL TOKENS, AND PLAYING FANTASY GAME USING SAID NON-FUNGIBLE DIGITAL TOKENS

FIELD OF THE INVENTION

The present invention relates to a computer-implemented system and method for allowing plurality of users to collect, own, trade and craft digital cards of players in the form of non-fungible tokens and to use such non-fungible tokens to play a fantasy game over a computer network.

BACKGROUND OF THE INVENTION

Non-fungible tokens are unique and non-interchangeable unit of data stored on a digital ledger. NFTs can be used to represent easily-reproducible items such as photos, videos, audio, and other types of digital files as unique items, and use blockchain technology to establish a verified and public proof of ownership.

However, there are no existing non-fungible tokens which represents real-world sporting players.

Further, there is no such fantasy system where the non-fungible tokens integrate with a fantasy platform.

Furthermore, in the existing fantasy platforms, there is no such provision where the users are allowed to trade their tokens and may also use these traded tokens to play the fantasy game.

In addition, there are no such fantasy platforms where the users are allowed to craft or improvise their tokens.

With the popularity of sports, various types of fantasy games have become prevalent. One such type of fantasy game is disclosed in the United States publication number 2009/0039,601.

The said application discloses a fantasy football deck of cards which includes a plurality of sets of cards each of which has indicia corresponding to a position of a player on a football team. Each of the cards is also assigned a number value that corresponds to that position. Different variations of fantasy football games can be played from the deck of cards.

However, the said publication only has disclosures limited to playing fantasy sports games in an offline manner where only the cards of the sports players are involved in the said fantasy game.

On the other hand, in recent times, people are more inclined towards online games. These online gaming platforms currently enable large numbers of users to remotely access them and play games over the internet. Users can earn real currency on these online gaming platforms.

One such type of online gaming platform is fantasy gaming platforms which provide an opportunity to win cash prizes, awards, and rewards. These online fantasy sport gaming platforms have become very popular with sports fans from all over the world.

In such fantasy gaming platforms, played over the internet, various users are allowed to select a plurality of players participating in a real-world sporting event, and form imaginary teams comprising of such players.

Thereafter, these teams compete based on statistical performance of the selected players in the real-world sporting event. The winner amongst the users is usually that user whose virtual team has scored the most aggregate points based on the performance of the selected players in real world sporting event. Such fantasy games are very common over the internet for sports, such as cricket, basketball, soccer and the like.

Further, these fantasy platforms simply associate limited attributes, such as name of the players, and based on such limited attributes, the users select the players and create a fantasy team.

Accordingly, these fantasy platforms do not allow the users to view the performance characteristics of the player, or the like.

Therefore, there is a need to develop a fantasy game and with-it digital tokens of the players which may include multiple attributes, such as performance characteristics of the player, or the like. This may allow the users with a better experience in selection of team, thereby enhancing user experience.

One such fantasy game is described in U.S. Pat. No. 8,523,648, wherein virtual tokens for playing virtual games are disclosed.

The said patent document discloses a game employing user-modifiable game components, such as tokens in a collectible token game. The game employs various features to provide user-modifiability, including sleeves, transparent tokens, stickers, and other elements. Electronic versions of the game and various other features are included, including tracking of history associated with such components.

Another similar fantasy game is described in US publication number 2003/0054,885. The said application discloses a system and method for creating an electronic community for trading information about fantasy sports leagues.

In the said '885 publication, the disclosed method allows the users to become members of the gaming community. Members of the gaming community can communicate with each other. These members of the community can create their own personalized fantasy sports team based on available electronic trading tokens.

However, the tokens, as disclosed in the said patent documents, although virtual, do not ensure the non-fungibility of the tokens, therefore, do not guarantee the uniqueness of the tokens.

The "non-fungibility" is ensured when the said digital tokens are represented by non-fungible tokens (NFT).

More specifically, the non-fungible tokens certify authenticity and ownership (as of the specific digital tokens and specific rights relating to it).

Further, the gaming platform disclosed in the said publication is limited to particular games and does not include any means for playing a fantasy sports game involving real-world players who are performing in a real-world sporting event.

Furthermore, the options for selecting the tokens for creating the team are also very limited in these disclosed patent documents.

Therefore, there is a need for a fantasy platform and a method in which some special tokens are provided to create the fantasy.

Therefore, there is a need to create a system where the non-fungible tokens of the real-world sporting players are integrated with the fantasy platform.

Therefore, there is a need for a fantasy platform in which the users are allowed to trade their tokens.

Further, there is the need for a fantasy platform where the users are allowed to craft/create tokens by using their owned tokens, and may also play with those created tokens and earn more points as compared to the tokens provided by a fantasy league management company.

In a nutshell, there is required a fantasy gaming platform and system, which may overcome the above-discussed drawbacks and provide an easy to operate and cost-effective system and method which allows the users to trade, craft non-fungible tokens, and allows the users to play a fantasy game using the non-fungible digital tokens.

SUMMARY OF THE INVENTION

In an aspect of the present invention, a system for allowing a plurality of the users to trade and craft the said non-fungible digital tokens, and allowing the said plurality of users to play a fantasy game using the said non-fungible digital tokens over a computer network. These non-fungible digital tokens represent real world sporting players involved in a real-world sporting event.

The system includes a blockchain network including a register for storing information related to the said plurality of non-fungible digital tokens. The said system further includes a minting module configured to mint the said plurality of non-fungible tokens.

Further, the said system includes a bundle generator module that is configured to the said blockchain network. The said bundle generator module is configured to generate bundles of the said plurality of non-fungible digital minted tokens. More specifically, each of the bundles comprising a predetermined number of the said non-fungible digital minted tokens of different rarity.

The said system further includes a computing device that includes a fantasy game application and the bundle generator module that is coupled to the said blockchain network. The said application is configured for allowing the users to play the fantasy game.

In one embodiment of the present invention, the said fantasy application includes a registration module configured to register a plurality of users.

Further, the said application includes a user interface module that is configured to display the plurality of minted non-fungible digital tokens.

In an embodiment of the present invention, the said fantasy application includes a trading module that is configured to facilitate the plurality of the users to trade the said tokens.

More specifically, the trading module facilitates the plurality of the users to buy the said non-fungible tokens for collecting and registering the ownership of the said non-fungible tokens, and sell the said non-fungible tokens.

In one embodiment of the present invention, the said fantasy application further includes a crafting module that is configured to facilitate the plurality of the users to craft/create the non-fungible tokens of higher rarity using the non-fungible tokens of lower rarity.

The said fantasy application further includes a fantasy team generator module that is configured to facilitate each of the users to select the plurality of the minted tokens from at least one of the traded tokens, crafted tokens, or the said bundles to create a personalized fantasy team.

In the embodiment of the present invention, the fantasy team generator module allows the users to play the said fantasy game.

In one embodiment of the present invention, selection of the non-fungible tokens from the bundles includes steps of releasing a predefined number of the bundles for the users for a predetermined time before the beginning of the real-world sporting event, and allowing the registered users to buy the said bundles before the beginning of the real-world sporting event.

In the embodiment of the present invention, the tokens received from the said bundles are used in the subsequent sporting events.

In one aspect of the present invention, a computer implemented method for allowing a plurality of the users to trade and craft the said non-fungible digital tokens, and allowing the said plurality of users to play a fantasy game using the said non-fungible digital tokens over a computer network is disclosed.

In one embodiment of the present invention, the method includes minting a plurality of non-fungible digital tokens. The said tokens being stored in the blockchain network including a register for storing information related to the said plurality of non-fungible digital tokens.

In the embodiment of the present invention, the information of the said tokens includes an image of a player, statistical characteristics of the player, standard attribute of the tokens, ownership of the said tokens, unique serial number of the tokens, or the like.

In the embodiment of the present invention, the plurality of non-fungible tokens is associated with experience points (XP) points based on the participation of the tokens in the real-world sporting event of the fantasy game. These (XP) points get updated on the said tokens after the completion of the sporting event.

The method further includes generating bundles of the said plurality of non-fungible digital tokens via the bundle generator module. Each of the bundles includes a predetermined number of the said non-fungible digital tokens of different rarity. The rarity of tokens in the said bundles comprises at least one of common tokens, rare tokens, or unique/epic tokens.

The term "rarity" herein refers to the availability of the said digital tokens in the said fantasy system.

In one embodiment, the rarity of the tokens is based on the number of the mints of the particular sporting player's token. The tokens of higher rarity may earn more points as compared to the tokens of the lower rarity in the fantasy game.

In the said embodiment of the present invention, the tokens of higher rarity mean that the tokens are available in limited number in the fantasy system.

In the embodiment of the present invention, the tokens of lower rarity mean that there is more availability of the said tokens in the said fantasy system.

Further, the method includes registering a plurality of users of the fantasy game via the registration module.

In one embodiment of the present invention, the method further includes displaying the plurality of minted non-fungible digital tokens to the users.

In the said embodiment of the present invention, the plurality of minted non-fungible digital tokens is unique to the users and the sporting event. Accordingly, the performance of the player in that event recorded on the digital token.

Thereafter, the method involves allowing the users to trade the plurality of non-fungible digital tokens, and based on that, the users are allowed to select the tokens from at least one of the traded tokens or the said bundles to create a personalized fantasy team via the fantasy team generator module.

In another embodiment of the present invention, the users are allowed to select the tokens which were traded in the previous sporting events.

In one embodiment of the present invention, the method involves trading the said plurality of non-fungible digital cards during, or after the completion of the sporting event via a trading module.

In the embodiment of the present invention, the trading of the said tokens includes the trading of the said tokens comprises auctioning of the said tokens.

In one embodiment of the present invention, for selling the said tokens, the users are allowed to set an ask price to sell the said plurality of non-fungible digital tokens.

In another embodiment of the present invention, for buying the said tokens, the users are allowed to place a bid to buy the said plurality of non-fungible digital tokens.

In one embodiment of the present invention, before selecting the non-fungible tokens from the bundles. The said bundles are released in a predefined number for the users for a predetermined time before the beginning of the real-world sporting event.

After that, the registered users are allowed to buy the said bundle/s. The tokens received from the bundles are allowed to be used in the fantasy games of the subsequent sporting events.

Thereafter, the method allows the users to play the said fantasy game to establish a winner amongst themselves based on the performance of the real-world sporting players in the real-world sporting event.

In the embodiment of the present invention, the fantasy team of the users collect fantasy points. The user having the fantasy team with most collected points is decided to be the winner of the said fantasy game.

In embodiment of the present invention, the method involves allowing the users to craft the plurality of non-fungible tokens.

In the embodiment of the present invention, crafting of the plurality of non-fungible tokens include converting a lower rarity token to that of higher rarity via a crafting module using a set of predetermined rules.

In the embodiment of the present invention, the predetermined rules comprise converting non-fungible token/s of a particular player with a lower rarity to craft a non-fungible token of higher rarity of that player.

In the embodiment of the present invention, the non-fungible token/s of a particular player with a lower rarity is/are used to craft a non-fungible token of higher rarity of that player.

In the embodiment of the present invention, the non-fungible crafted tokens include tokens of various rarity, such as rare tokens, unique/epic tokens, genesis tokens, legendary tokens. The rarity of the said tokens is arranged in the order respectively.

In one embodiment of the present invention, a predefined number of XP points and trade coins and predetermined time-period are required to craft the tokens. The time-period for crafting the tokens reduces by increasing the number of the trade coins in the said crafting.

This together with the other aspects of the present invention along with the various features of novelty that characterized the present disclosure is pointed out with particularity in claims annexed hereto and forms a part of the present invention. For a better understanding of the present disclosure, its operating advantages, and the specified objective attained by its uses, reference should be made to the accompanying descriptive matter in which there are illustrated exemplary embodiments of the present invention.

DESCRIPTION OF THE DRAWINGS

The advantages and features of the present invention will become better understood with reference to the following detailed description taken in conjunction with the accompanying drawings, in which:

FIG. 4A illustrates a framework for in-game milestones of the real-world players in a real-world sport, such as cricket, according to various embodiments of the present invention;

FIG. 4B illustrates a framework for cumulative milestones of the real-world players in a real-world sport, such as cricket, according to various embodiments of the present invention;

FIGS. 5A & 5B illustrate a framework of records of the real-world players, according to various embodiments of the present invention;

Like numerals denote like elements throughout the figures.

DESCRIPTION OF THE INVENTION

The exemplary embodiments described herein detail for illustrative purposes are subjected to many variations. It should be emphasized, however, that the present invention is not limited to as disclosed.

It is understood that various omissions and substitutions of equivalents are contemplated as circumstances may suggest or render expedient, but these are intended to cover the application or implementation without departing from the spirit or scope of the present invention.

Specifically, the following terms have the meanings indicated below.

The terms "a" and "an" herein do not denote a limitation of quantity, but rather denote the presence of at least one of the referenced items.

The terms "having", "comprising", "including", and variations thereof signify the presence of a component.

The present invention discloses a system for allowing a plurality of the users to trade and craft the said non-fungible digital tokens, and allowing the said plurality of users to play a fantasy game using the said non-fungible digital tokens, over a computer network.

The term "non-fungible token (NFT)" herein refers to a unit of information stored on a digital ledger, called a blockchain, that certifies digital tokens to be unique and therefore not interchangeable.

More specifically, the non-fungible tokens certify authenticity and ownership (as of the specific digital tokens and specific rights relating to it).

The term "fantasy game" as referred herein relates to the sports games which are played over the internet, in which various users are allowed to select a plurality of players participating in a real-world sporting event, and form imaginary teams comprising of such players.

Thereafter, these teams compete based on statistical performance of the selected players in the real-world sporting event. The winner amongst the users is usually that user whose virtual team has scored the most aggregate points based on the performance of the selected players in real world sporting event. Such fantasy games are very common over the internet for sports, such as cricket, basketball, soccer and the like.

Now, the inventive aspects of the invention along with various components and engineering involved will now be explained with reference to FIGS. 1-12 herein.

Figure 1:
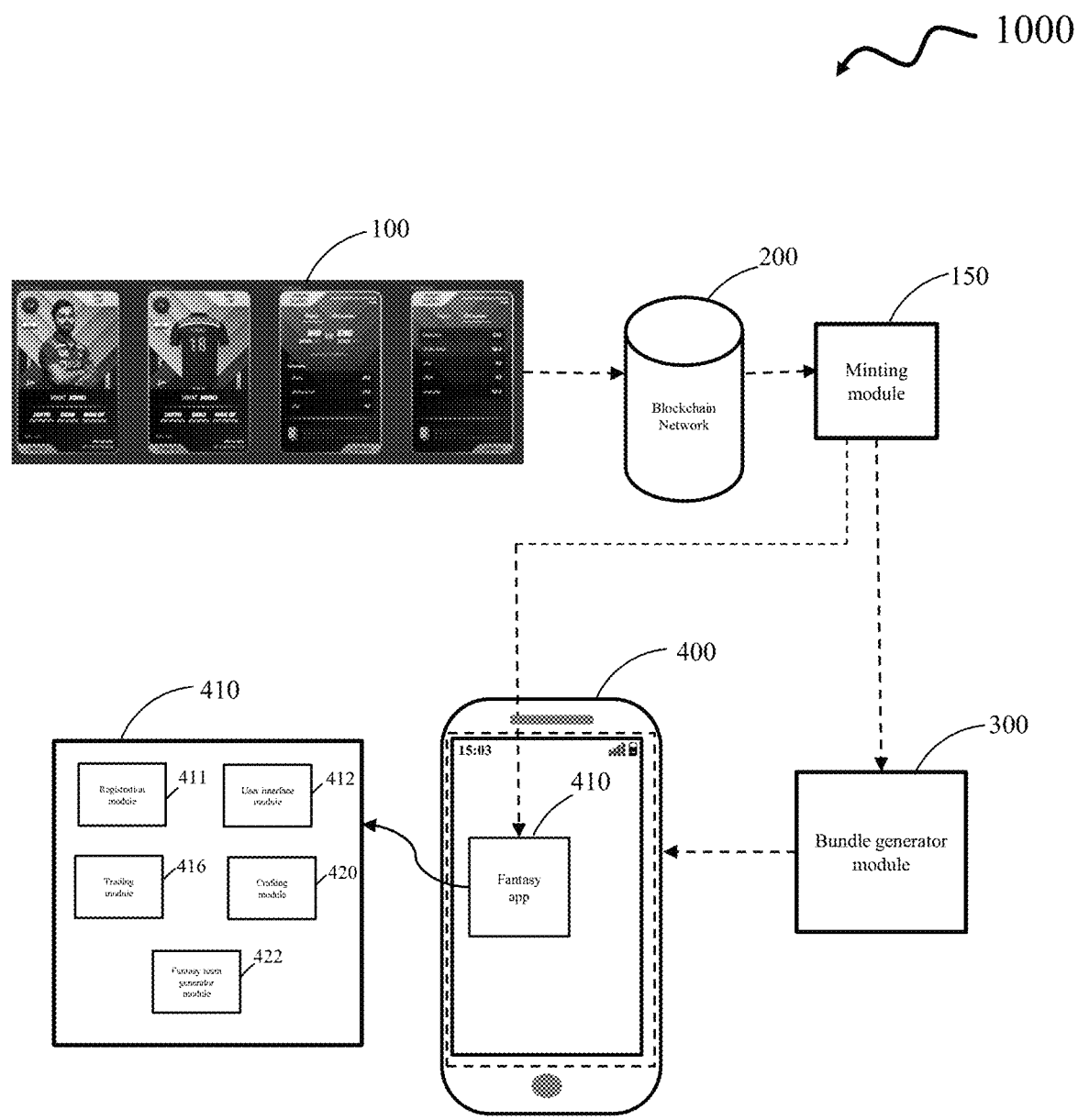
FIG. 1 illustrates a fantasy system for trading and crafting non-fungible digital tokens, and playing fantasy game using the said non-fungible digital tokens, according to various embodiments of the present invention.

Referring to FIG. 1, a fantasy system for trading and crafting non-fungible tokens, and playing the fantasy game using the said non-fungible digital tokens, according to various embodiments of the present invention is disclosed.

In an embodiment of the present invention, the said plurality of non-fungible digital tokens (100) represents real world sporting players involved in a real-world sporting event.

In the embodiment of the present invention, the fantasy games may include but not limited to games for sports, such as cricket, football, volleyball, or the like. However, for the sake of simplicity, the present invention is explained by taking cricket as an exemplary sport without incurring any limitation on the invention.

In various embodiments, the different fantasy games in the said system (1000) are represented by a unique identity (ID) which is granted to each of the fantasy games.

In one exemplary embodiment of the present invention, each of the sporting players involving in the real-world sporting is assigned with a unique ID. This ID does not change from match to match. This ID allows to fetch the data for that player from the statistics repositories to be displayed on the token (100).

In another exemplary embodiment of the present invention, a unique ID may also be granted to every event/match.

In the said exemplary embodiment of the present invention, the match ID is tagged to a league ID and fantasy game ID. Further, each Match ID is tagged with the player ID of the players playing in that said real-world sporting event/match.

In yet another exemplary embodiment of the present invention, the league ID is a unique ID which is granted to a fantasy tournament/league. For example, Indian Premier League (IPL) may be given a unique ID relevant to the said league.

In one embodiment of the present invention, combination of match ID and player ID may make a unique ID for the token (100) for the said event/match.

In one embodiment of the present invention, the token (100) may also be made unique by a mint number of the token (100).

In the exemplary embodiment of the present invention, there may be multiple tokens (100) of the same player from the particular event.

In one embodiment of the present invention, the system (1000) includes a blockchain network (200) including a register for storing information related to the said plurality of non-fungible digital tokens (100). As a result, each token becomes uniquely identifiable.

The system (100) further includes a minting module (150) that is configured to mint the said plurality of non-fungible tokens (100).

The term "minting" herein refers to a process of turning the digital tokens (100) into a part of the blockchain. The minting process further involves assigning the ownership to the said NFTs for ensuring authenticity.

Figure 3:
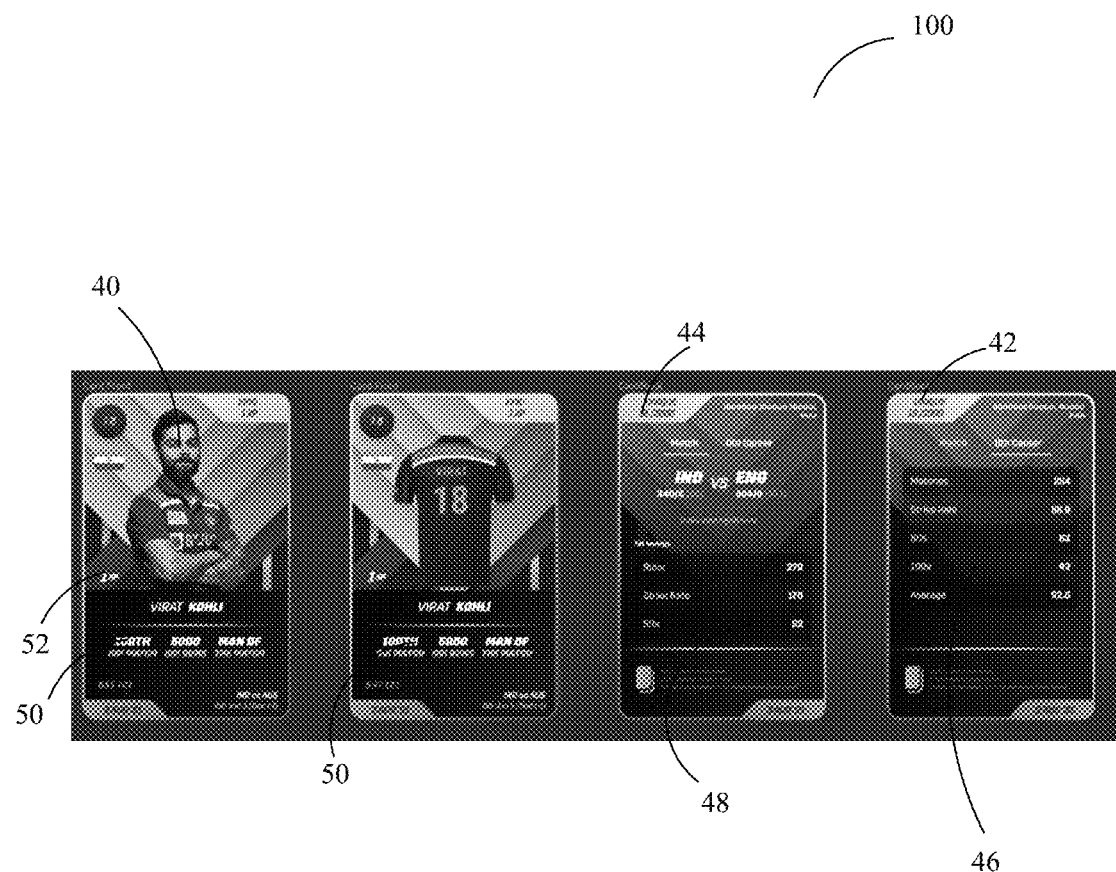
FIG. 3 illustrates snapshot of a non-fungible digital token for playing the fantasy game for a real-world sport, such as cricket, according to an exemplary embodiment of the present invention.

In the embodiment of the present invention, an exemplary token (100) of tokens (100) may have information which includes an image (40) of a player, statistical characteristics of the player, standard attribute of the tokens, ownership of the said tokens, unique serial number (44) of the tokens, or the like. Reference is made to FIG. 3, which shows such a token (100).

In one embodiment of the present invention, the tokens (100) also include some dynamic attributes such as experience points (XP) points (52), by default, each of the said plurality of non-fungible digital tokens (100) carries 1 XP point at the time of minting.

In the embodiment of the present invention, these (XP) points are associated with the tokens (100) based on the participation of the tokens (100) in the real-world sporting event of the fantasy game. These XP points (52) get updated on the said tokens (100) after the completion of the sporting event.

In the exemplary embodiment of the present invention, a non-fungible digital token is shown in FIG. 3. The said token is for the reference, and such depiction is only exemplary and should not be construed as a limitation to the present invention.

In the embodiment of the present invention, each of the said plurality of non-fungible digital tokens (100) may also include intrinsic data associated therewith, such as player metadata which includes name of the player, jersey number of the player, image of the player, country of the player or the like (Refer to FIG. 3)

Some other data on the tokens (100) may also include match metadata, date, location, tournament, teams, result, cumulative career statistics (46) of the player etc. (Refer to FIG. 3). Again, it is emphasized that the depiction of the token (100) as in the FIG. 3 is purely exemplary, and variations thereof should be construed as part of the instant disclosure.

Referring to FIG. 3 again, the other attributes of the tokens (100) also include a set of standard attributes which are also showcased in the said tokens (100).

These attributes may further be fixed attributes and are known and hence shown in the pre-match phase of the fantasy game to the users. These attributes may dictate number of mints of each of the tokens (100) and its' design.

Further, these standard attributes also include attributes such as rarity (42) of the said tokens (100). In an embodiment, the rarity (42) is not adjustable for the same token (100).

The term "rarity" herein refers to the availability of the said digital tokens in the said gaming system (1000). The rarity (42) of the tokens (100) is based on the number of the mints of the particular player's token (100). The tokens of higher rarity may earn more points as compared to the tokens of the lower rarity in the fantasy game.

In the embodiment of the present invention, the tokens of higher rarity mean that the tokens are available in limited number in the fantasy system (1000).

In the embodiment of the present invention, the tokens of lower rarity mean that there is more availability of the said tokens (100) in the said fantasy system (1000).

More specifically, the said non-fungible tokens (100) are divided into exemplary rarity (42), such as common tokens, rare tokens, epic tokens, genesis tokens and legendary tokens (these are arranged according to the rarity of the tokens (100)) (Refer to FIG. 3). These rarities listed are exemplary, and are non-exhaustive. The tokens animation, design or color may refer based on the rarity of the tokens (100).

In the exemplary embodiment of the present invention, the rarity (42) of the tokens is such that the rarity of the common tokens is lower than that of the rare tokens. Similarly, rarity of the rare tokens is lower than rarity of epic tokens, and so on. Accordingly, the rarity of the legendary tokens may be highest.

In the embodiment of the present invention, the tokens (100) of lower rarity earn less points as compared to tokens (100) of higher attribute/higher rarity in the fantasy game.

In the exemplary embodiment of the present invention, the common tokens earn 1× points, the rare tokens earn 1.5× points, unique/epic tokens earn 2× points, genesis tokens earn 2.5× points and legendary tokens earn 3× points. The way these rarities is employed in the playing of the fantasy game will be explained later in the description.

In one embodiment of the present invention, coming back to referring FIG. 3, the attributes of the tokens may also include in-game live score (48) updates and special attributes (Refer to FIG. 3).

In the embodiment of the present invention, in-game scores (48) are such that they are dynamic in nature and may keep get updated during the in-match phase. The said in-game scores (48) are finalized after the completion of the real-world sporting event.

On the other hand, the special attributes (50) are those attributes that player acquires during the real-world events. At a high level the dynamic attributes can be further split into two types i.e., fixed milestones and dynamic milestones.

In the said embodiment of the present invention, the fixed milestones (50) are those attributes that the each of the tokens (100) carries based on events that are certain to happen.

For example, a player playing his milestone match, such as $100^{th}$ match in sport of cricket, player's debut or retirement match, or the like. These milestones are showcased on the face of the tokens (100) along with the player metadata (Refer to FIG. 3).

On the other hand, the dynamic milestones are those attributes that a player achieves in a particular event or cumulatively in his career in that specific event.

For example, a player getting to 10,000 career runs in cricket, hitting 100 career sixes etc. in cricket are examples. These are not sure to happen but there is some probability of it happening.

In one embodiment of the present invention, the scores and milestones may not carry equal weight in real world. For example, scoring 100 runs in a cricketing match is a bigger achievement than scoring 50 runs in cricketing match, and so on.

Therefore, the fantasy system (1000) is developed in such a way, that the said system (1000) quantifies the rarity of achievement with logic, and based on the said rarity, determines how would achievements of different rarities be visually showcased on the said non-fungible digital tokens (100).

In the exemplary embodiment of the present invention, the method (500) may allow to showcase the achievements with different color schemes on the said tokens (100).

In the said embodiment of the present invention, each of the color schemes may represent achievements based on the priority or the rarity of the achievements. For example: the achievements showcased by green color are representing rare achievements.

In the embodiment of the present invention, the rarest achievements may get update in every section of the tokens (100), and the common achievements get update in the in-game statistic section.

In one exemplary embodiment of the present invention, referring to FIG. 4A, a framework for in-game milestones is shown. Again, example is taken for the sport of cricket, however, such a framework may be easily transposable in other sports, such as soccer etc.

The in-game's rare or most rare achievements (moving from left to right in FIG. 4A) updated on in-game statistics of the said tokens (100) and on the face of the said tokens (100).

In the embodiment of the present invention, the rows contain all the in-game achievements relevant for a bowler in sports of cricket (Refer to FIG. 4A).

In the exemplary embodiment of the present invention, if a player takes a 5 wickets haul in a cricket match, it gets updated in "face section" and "in-game section".

On the other hand, the common achievements get updated only on in-game statistics of the said tokens (100).

In another exemplary embodiment of the present invention, referring to FIG. 4B, a framework for cumulative milestones is shown. The cumulative rare or most rare achievements (moving down vertically of FIG. 4B) get updated in all section of the said tokens (100), whereas, if a player takes 500 One Day International or ODI wickets in its cricket career, then it gets updated in all sections of the tokens (100).

In one embodiment of the present invention, the tokens (100) components also include records of the players.

In the exemplary embodiment of the present invention, frameworks for records are shown in FIGS. 5A & 5B. Again, the illustration is specific to the sports of cricket, and similar, framework may be designable for other sports, such as soccer, baseball etc.

As shown in FIGS. 5A & 5B, the said records can be exemplary be positive or negative.

In the said exemplary embodiment of the present invention, referring to FIG. 5A, a framework for positive records is shown. For example, a player hitting fastest century in a game, the rarity increases as moving vertically downward in each category. (Refer to FIG. 5A).

In the said exemplary embodiment of the present invention, referring to FIG. 5B, a framework for negative records is shown. For example, a player hitting slowest century. The rarity increases as moving vertically downward in each category. (Refer to FIG. 5B).

In one embodiment of the present invention, the said system (1000) further includes a bundle generator module (300) configured to the said blockchain network (200).

In the said bundle generator module configured to generate bundles of the said plurality of non-fungible digital minted tokens (100). Each of the bundles including a predetermined number of the said non-fungible digital minted tokens (100) of different rarity.

In one embodiment of the present invention, the system (1000) further includes a computing device (400). The said computing device (400) includes a fantasy application (410) that is configured to the said blockchain network (200) and the bundle generator module (300).

In the said embodiment of the present invention, the said fantasy application (410) may be installed in the computing device (400) of the users.

The said computing device (400) may be any computing device, such as smart phones, tablets, computer, or the like.

In one embodiment of the present invention, the said application (410) includes a trading module (416) configured to facilitate the plurality of the users to trade the said non-fungible tokens (100).

In the said embodiment of the present invention, the said trading module (416) facilitates the users to buy the non-fungible tokens (100) for collecting and registering ownership of the said non-fungible tokens (100).

In another embodiment of the present invention, the said trading module (416) facilitates the users to sell the non-fungible tokens (100).

In one embodiment of the present invention, the said fantasy application (410) includes a registration module (411) configured to register a plurality of users.

In one embodiment of the present invention, the said fantasy application (410) includes a user interface module (412) configured to display the plurality of minted non-fungible digital tokens (100).

Figure 3A:
FIG. 3A illustrates snapshot of a fantasy tab screen displaying the real-world sporting events in which a user of the fantasy game has participated, according to an exemplary embodiment of the present invention.

In the embodiment of the present invention, the said user interface module (412) having various tabs. One of the tabs may be referred to as a fantasy tab (424) for showcasing the upcoming sporting events as well as the events in which the users have registered/participated (Refer to FIGS. 1 & 3A).

In one embodiment of the present invention, the fantasy tab screen is the default screen. More specifically, the said screen is divided into two parts i.e. My sporting events/matches and upcoming events/matches, and in "My events" feature, the user's latest events/matches which are arranged in order of priority i.e., Live, Completed, and Upcoming events in which the user has participated (Refer to FIG. 3A).

In the said embodiment of the present invention, the said "My events" section is dynamically updated, and not be present initially when the user has not participated in a match contest.

Figure 3B:
FIG. 3B illustrates snapshot of a fantasy tab screen displaying the real-world sporting events in which the user of the fantasy game has not participated, according to an exemplary embodiment of the present invention.

In one embodiment of the present invention, the fantasy tab screen (424) further showcases the upcoming events in which the users may participate. More specifically, the upcoming events lists all the upcoming events, except for the events that the user has participated for, in a very similar fashion as shown on conventional fantasy platforms (Refer to FIG. 3B).

In the said embodiment of the present invention, the plurality of minted non-fungible digital tokens is unique to the users and the sporting event. Accordingly, the performance of the player in that event recorded on the digital token.

Figure 8:
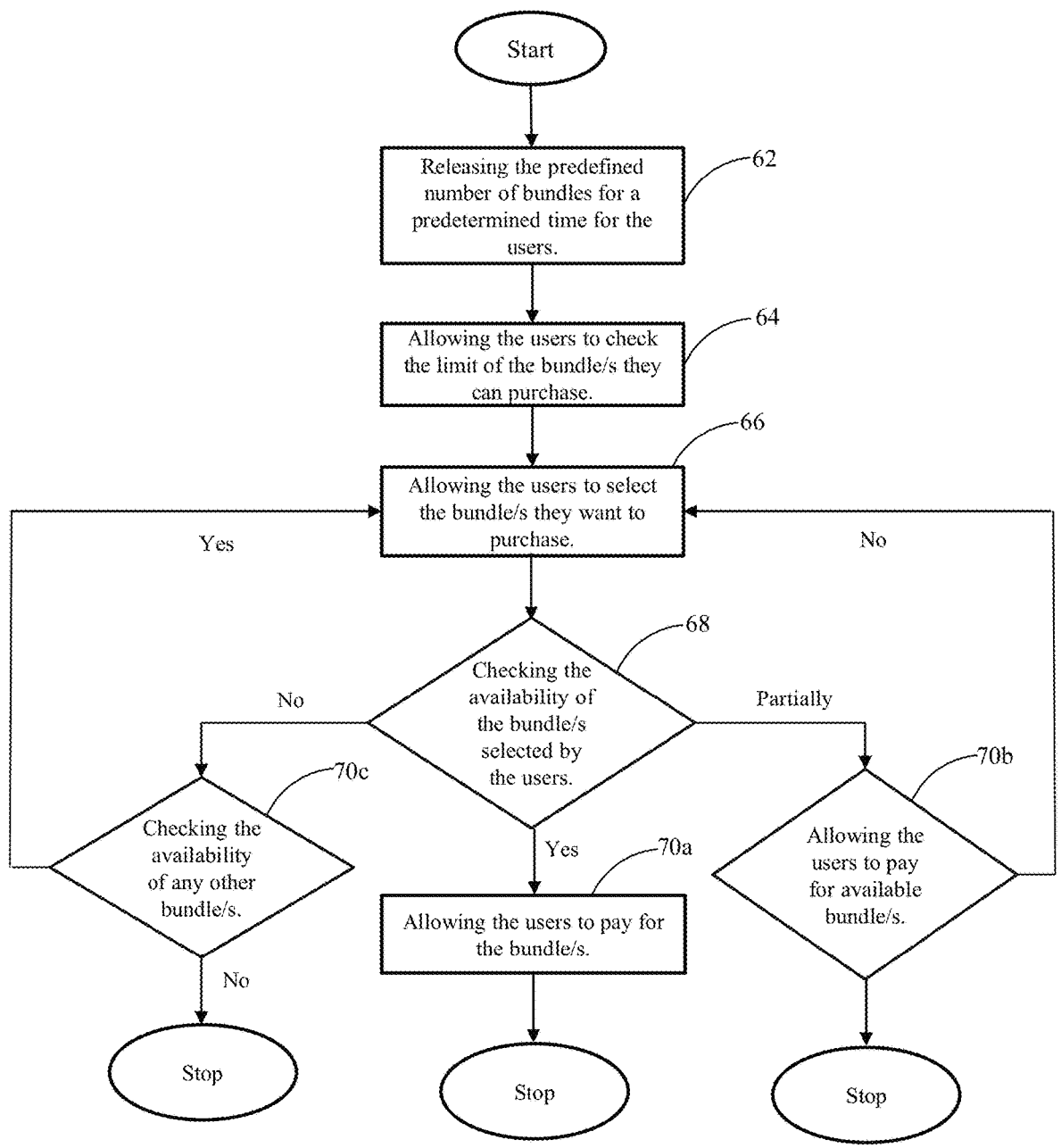
FIG. 8 illustrates an exemplary flowchart representing a process for purchasing the bundles of the non-fungible digital tokens of FIG. 3 for playing the fantasy game, according to various embodiments of the present invention.
Figure 8A:
FIGS. 8A-8E illustrate snapshots representing purchasing and opening of the bundles of FIG. 3 for playing the fantasy game, according to various embodiments of the present invention.
Figure 8B:
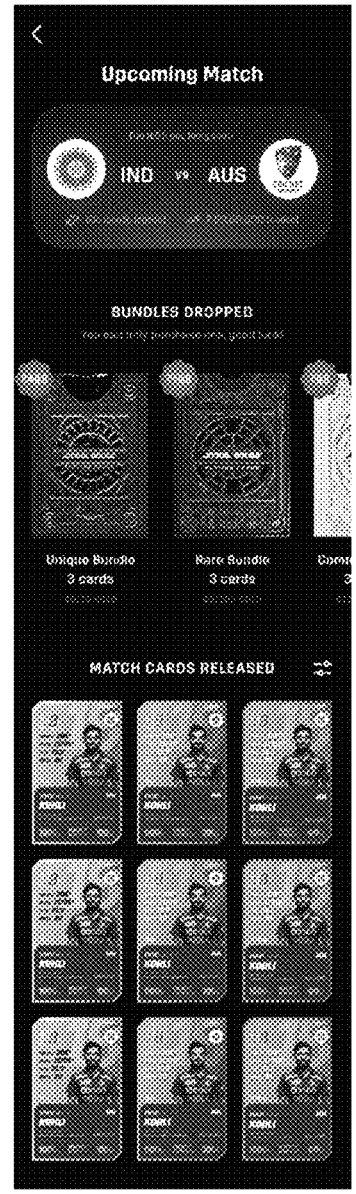
Figure 8C:
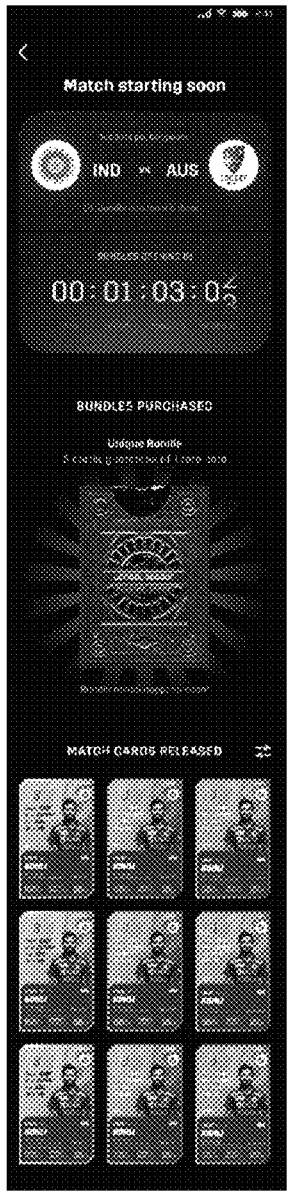

In the exemplary embodiment of the present invention, the said non-fungible digital tokens (100) are showcased after clicking on event/match tab on which the users have participated (Refer FIGS. 8A-8C).

In another embodiment of the present invention, the tokens (100) owned by the users are also visible in the player's profile.

In one embodiment of the present invention, the fantasy application (410) further includes a crafting module (420) configured to facilitate the plurality of the users to craft/create the non-fungible tokens of higher rarity using the non-fungible tokens of lower rarity.

The said fantasy app (410) further includes a fantasy team generator module (422) configured to facilitate each of the users to select the plurality of the minted tokens from at least one of the traded tokens, crafted tokens, or the said bundles to create a personalized fantasy team.

In the embodiment of the present invention, the users are allowed to select the tokens dropped from bundles in the fantasy games of the subsequent sporting events.

In the said embodiment of the present invention, the said fantasy team generator module (422) allows the users to play the said fantasy game via the selected tokens.

In the said embodiment of the present invention, the fantasy game is played to establish a winner amongst themselves. The winner being decided based on the performance of the fantasy team in the said real world sporting event.

Figure 2:
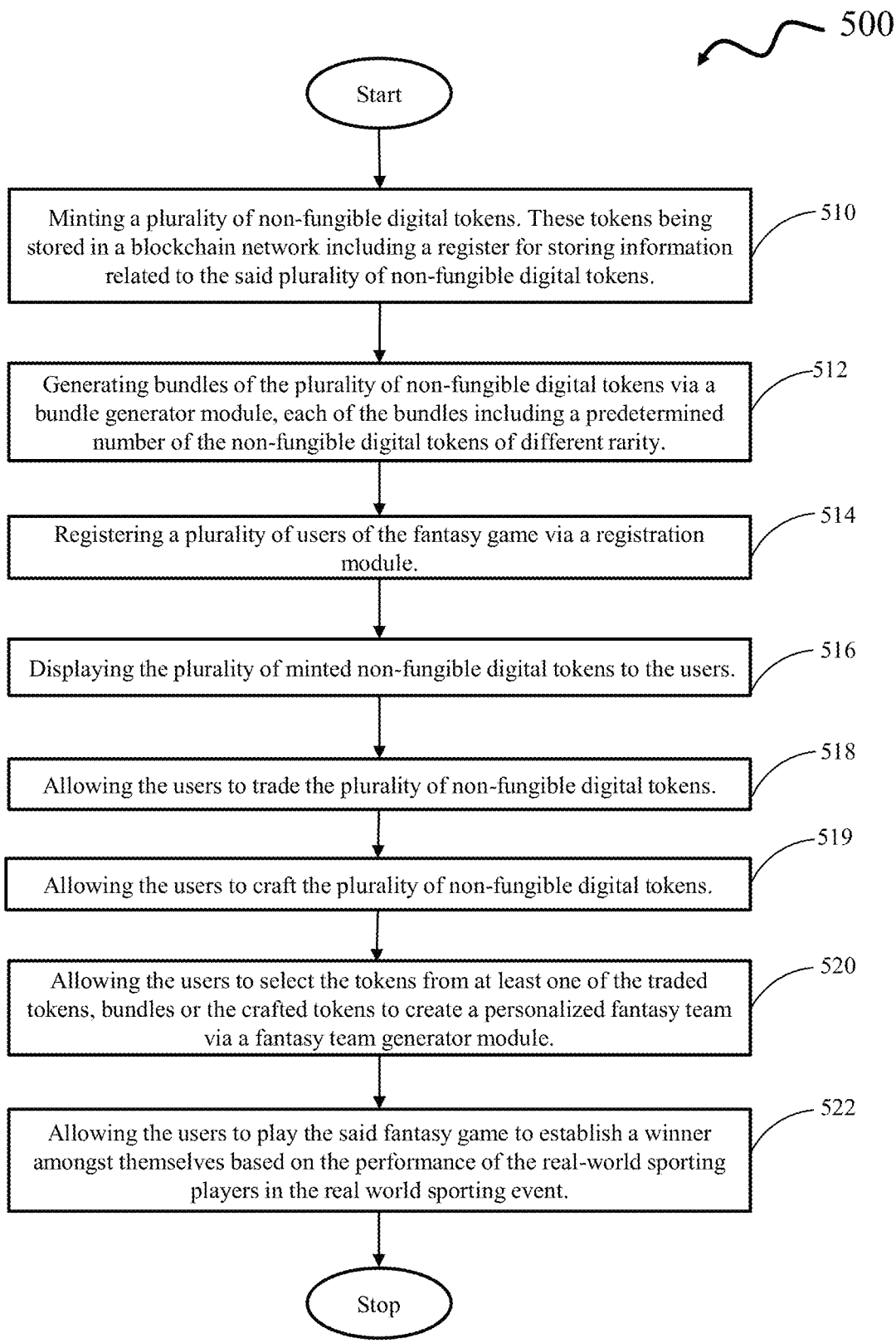
FIG. 2 illustrates an exemplary flowchart representing a computer-implemented method for trading and crafting non-fungible digital tokens, and playing the fantasy game using the non-fungible digital tokens, according to various embodiments of the present invention.

In various embodiments of the present invention, referring to FIG. 2, a flowchart is representing a computer-implemented method (500) for allowing for allowing a plurality of users to trade and craft non-fungible digital tokens, and allowing the said plurality of users to play a fantasy game using the said non-fungible digital tokens over a computer network.

Referring to FIGS. 1 & 2, at step (510), the computer implemented method (500) allows minting the plurality of non-fungible digital tokens (100) via a minting module (150).

In the embodiment of the present invention, the said tokens (100) being stored in the blockchain network (200).

Such a network may include a register for storing information related to the said plurality of non-fungible digital tokens (100) (Refer to FIG. 2).

Again, referring to FIGS. 1 & 2, the said method (500), further at step (512), involves generating bundles of the said plurality of non-fungible digital tokens (100).

The said bundles of the tokens (100) may be generated via the bundle generator module (300). Each of the said bundles essentially includes a predetermined number of the non-fungible digital tokens (100) of different rarities.

In the said embodiment of the present invention, each of the said bundles includes at least one of tokens of different rarity, such as common tokens, rare tokens or unique/epic tokens.

Now, it will be explained how plurality of users can play and compete in a fantasy game employing the non-fungible tokens (100).

Reference is made at step (514) of FIG. 2. There is shown that the method (500) involves registering a plurality of users of the fantasy game via the registration module (411) (Refer to FIG. 1).

In the exemplary embodiment of the present invention, the plurality of users may be allowed to register before a beginning of the real-world sporting event. The said users may be provided with a user ID after the registration. The "User ID" herein refers to a unique ID granted to the users when they register with the fantasy application (410) (Refer to FIG. 1).

Further, at step (516), the method (500) further involves displaying the plurality of minted non-fungible digital tokens (100) to the users before beginning of the said real-world sporting event (Refer to FIG. 1).

In one embodiment, the said tokens (100) to be used in the said fantasy game are of the previous sporting events.

Further, at step (518), the method (500) involves allowing the users to trade the plurality of non-fungible digital tokens (100).

In one embodiment of the present invention, the users are allowed to purchase the tokens (100) which are available by default.

In another embodiment of the present invention, the users are allowed to buy or sell the said non-fungible tokens (100) through auctioning of the said tokens (100) via the trading module (416) (Refer to FIG. 2).

In the embodiment of the present invention, the said tokens (100) may be traded during the real-world sporting event or after the completion of the sporting event for which such tokens have been minted.

In another embodiment of the present invention, if the said tokens (100) are being used in the fantasy game of a sporting event, they may not be traded until the completion of such sporting event.

In the embodiment of the present invention, the auctioning of the said tokens (100) is explained with reference to FIGS. 6-7B.

Figure 6:
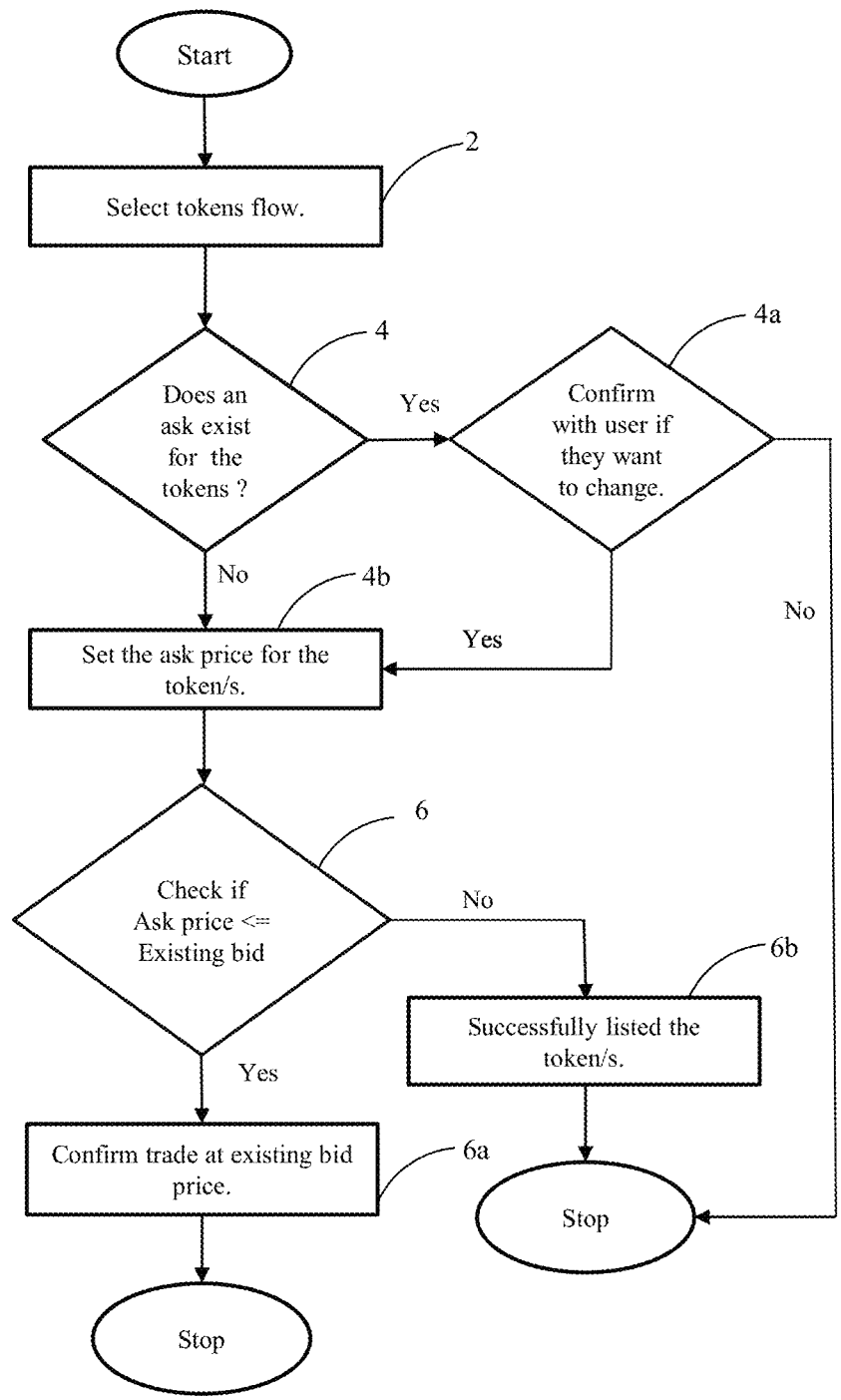
FIG. 6 illustrates an exemplary flowchart representing a process for setting an ask price for the non-fungible digital tokens of FIG. 3 for playing the fantasy game, according to various embodiments of the present invention.

Referring to FIG. 6, a flowchart illustrating a process which allows the users sell their tokens (100).

At step (2), the users are allowed to select the token/s, they want to sell.

After that at step (4), the uses are allowed to check the existing ask price of the said token/s (100).

In the embodiment of the present invention, if there exists the ask price for the token/s, then at step (4a), the users are allowed to confirm with the users if they want to change the ask price for the said token/s.

In the embodiment of the present invention, if the users are willing to change the ask price of the said tokens, then the users follow step (4b) (Refer to FIG. 6).

Figure 6A:
FIGS. 6A & 6B illustrate snapshots presenting selling of the non-fungible digital tokens of FIG. 3 for playing the fantasy game, according to various embodiments of the present invention.

In the embodiment of the present invention, if there is no ask price for the token/s, then the users are allowed to set the ask price for the said token, as shown in step (4b) (Refer to FIG. 6A).

Thereafter, at step (6), the users are allowed to check the existing bid for the said token/s placed by other users of the fantasy application (410) (Refer to FIG. 6A). The process for placing a bid will be explained later.

In one embodiment of the present invention, if the bid for token/s is greater or equal to the ask price, then the user may sell their token/s as shown in step (6a).

Figure 6B:
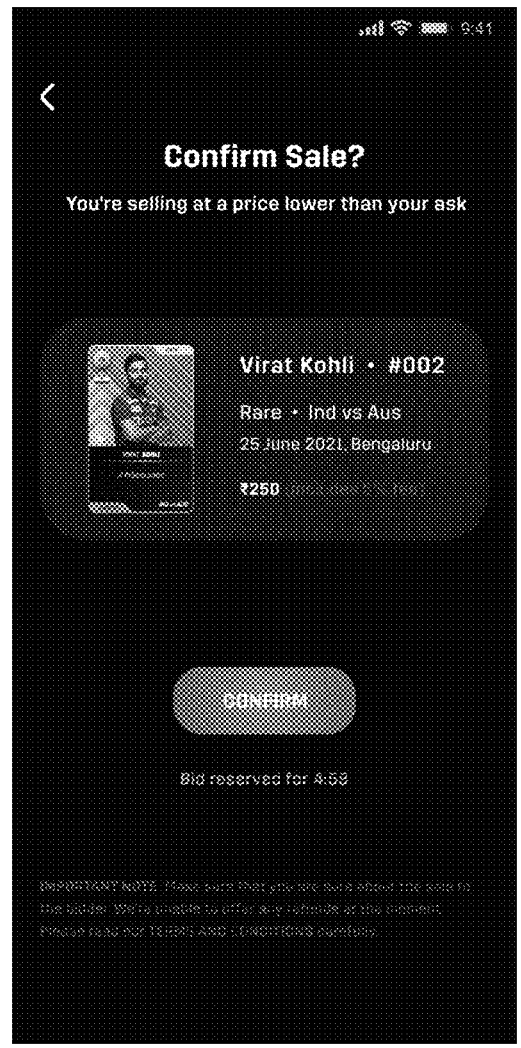

In another embodiment of the present invention, if the bid for token/s is lower than the ask price, then the users may not sell their token/s, and thereby just listing the said token/s for selling, as shown in step (6b) (Refer to FIG. 6B).

Figure 7:
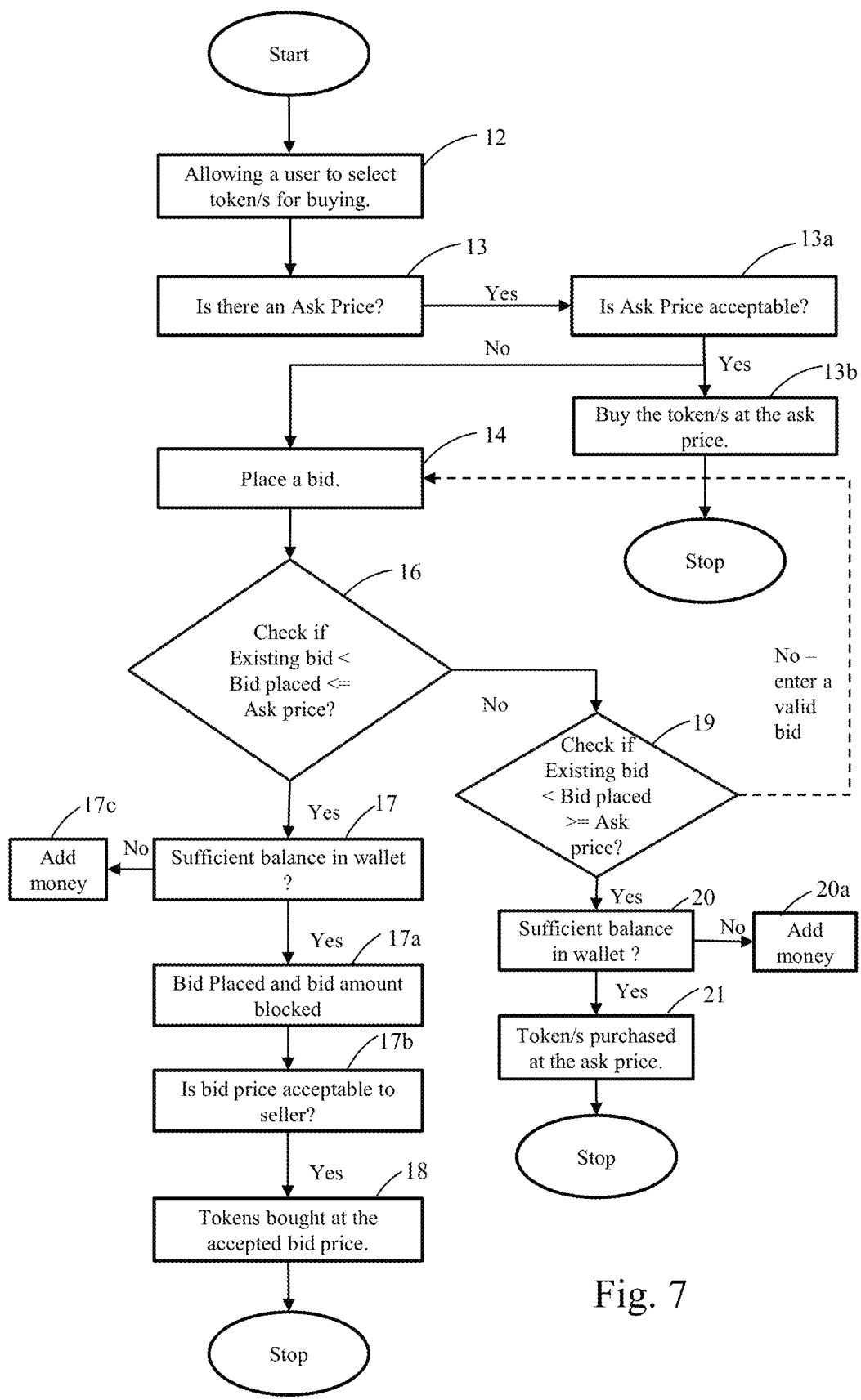
FIG. 7 illustrates an exemplary flowchart representing a process for buying the non-fungible digital tokens of FIG. 3 for playing the fantasy game, according to various embodiments of the present invention.

Referring to FIG. 7, there is shown a flowchart illustrating a process which allows the users to buy the said non-fungible digital tokens (100).

Figures 7A, 7B:
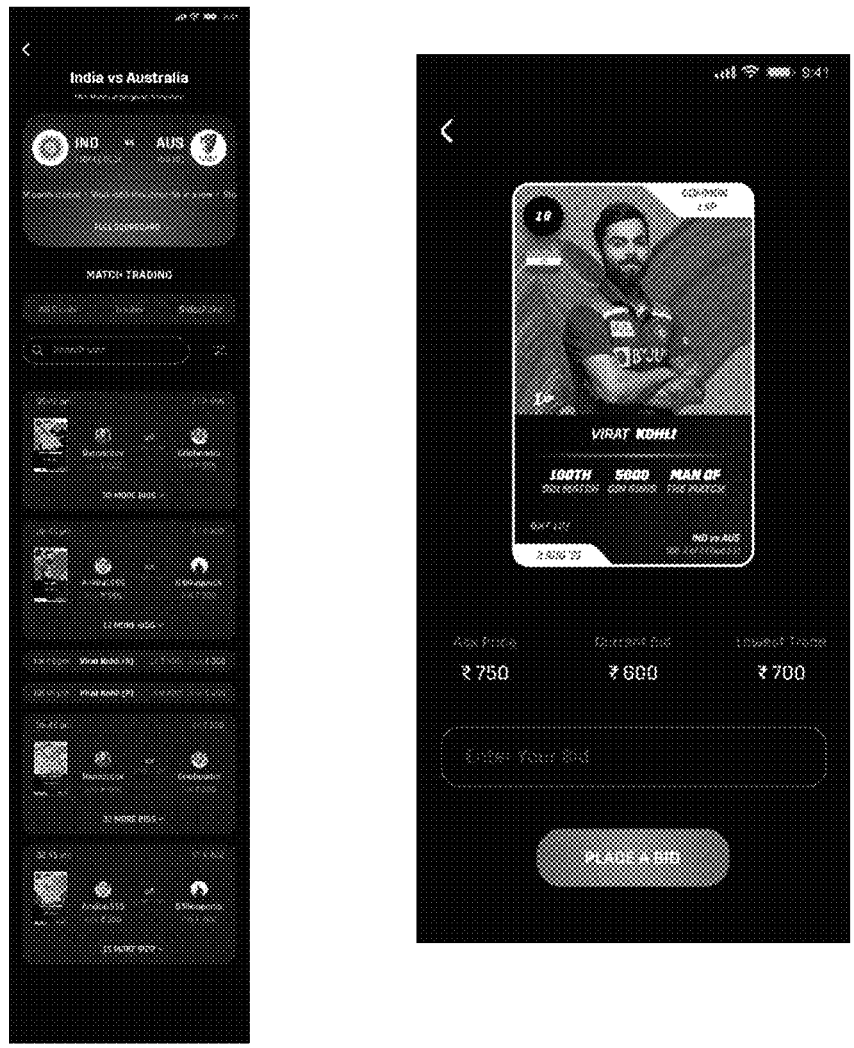
FIGS. 7A & 7B illustrate snapshots representing buying of the non-fungible digital tokens of FIG. 3 for playing fantasy game, according to various embodiments of the present invention.

The process initiates at step (12), wherein the user is allowed to select the token/s, he/she wants to buy from the tokens (100) which are listed as default (Refer to FIG. 7a).

In one embodiment of the present invention, the method (500) allows the users to delist the tokens (100) from trading, which are listed for trading.

In one embodiment of the present invention, the user may also search for the token/s of a particular player he/she wants to buy. The user may also search the token/s by serial number of the token/s.

Referring to FIG. 7, at step (13), the user is allowed to check for an ask price for the token/s (100). Thereafter, if the ask price is available for the token/s, then there is a need to check whether the said ask price is acceptable or not at step (13a)?

If the ask price is acceptable, then the user is simply allowed to buy the token/s at the said ask price at step (13b).

However, if the ask price is not acceptable, then the user is allowed to place a bid for the said token/s at step (14). (Refer to FIG. 7b).

Subsequently, at step (16), the process involves checking the existing bid for the said token/s (Refer to FIG. 7).

In the embodiment of the present invention, if the existing bid is lower than the placed bid, however, on the other hand, the placed bid is lesser than the ask price of the said token/s, then the balance in a wallet of the user/s is checked before allowing the user to buy the said tokens (100) as shown at step (17).

In the embodiment of the present invention, if there is sufficient balance in the wallet, then the bid for token/s get placed and bid amount get blocked at step (17a). If there is no sufficient balance in the wallet then the user is allowed to add money at step (17c) (Refer FIG. 7) in order to facilitate the buying.

In the said embodiment of the present invention, after a successful bid is placed, there is additionally a need to check if the placed bid is acceptable to the owner/seller of the token/s at step (17b).

In the embodiment of the present invention, if the placed bid is accepted by the seller/owner of the token/s (100), then the user is allowed to buy the token/s at the accepted bid price at step (18) (Refer FIG. 7).

In the embodiment of the present invention, if, however the placed bid is greater than or equal to the ask price of the token as shown in step (19), then the balance in a wallet of the user is directly checked before the step of buying the said tokens (100) as shown at step (20) (Refer FIG. 7).

In the embodiment of the present invention, if there is sufficient balance in the wallet, then the user is asked to buy the said token/s at the ask price as shown in step (21), however, if there is no sufficient balance in the wallet, then the user is allowed to add money in the wallet at step (20a). (Refer FIG. 7).

In another embodiment of the present invention, if the existing bid is higher than the placed bid, then the user is allowed to place another valid bid for the said token/s by following step (14).

In this manner, the bidding of tokens is carried out in the present invention.

Again, referring to FIG. 2, at step (519), the method (500) may also allow the users to craft the plurality of non-fungible tokens (100) for playing fantasy game.

In the said embodiment of the present invention, crafting of the plurality of non-fungible tokens (100) includes converting a lower rarity token (100) to that of higher rarity via a crafting module (420). The said crafting module (420) includes a list of instructions for or a set of predetermined rules, to carry out crafting.

Figure 12:
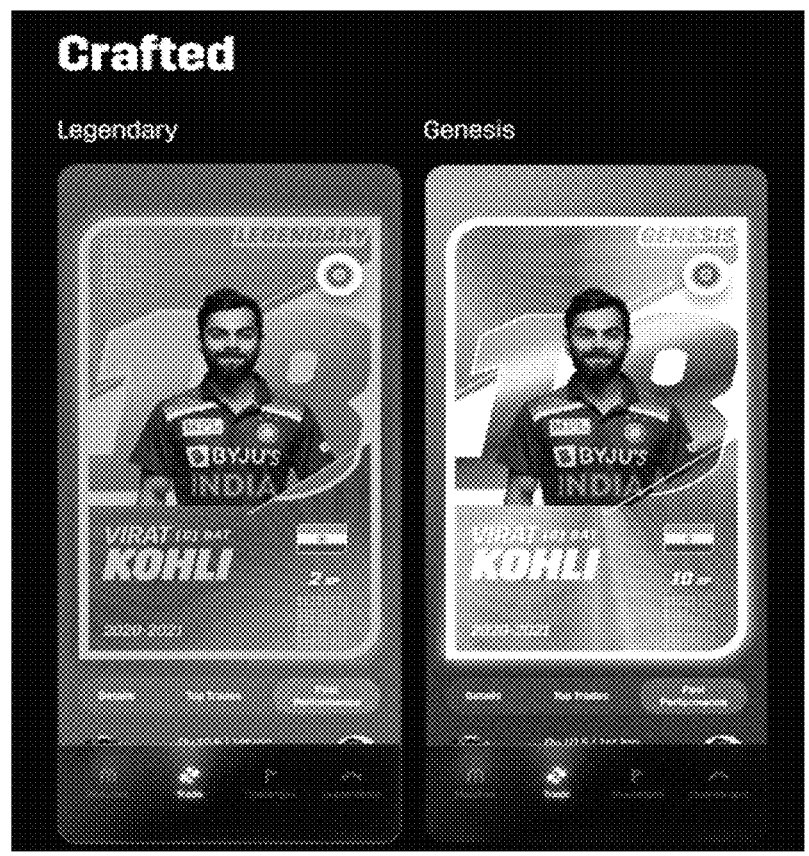
FIG. 12 illustrates snapshot representing crafted tokens of higher rarity, according to various embodiments of the present invention.

In the exemplary embodiment for the present invention, the said crafted tokens are shown in FIG. 12.

In one embodiment of the present invention, the predetermined rules may include:
converting non-fungible token/s (100) of a particular player with a lower rarity to craft a non-fungible token (100) of higher rarity of that particular player.

In the exemplary embodiment of the present invention, the said process of crafting a higher-rarity token (100) of a player, the users may need lower rarity token/s (100) of the said player.

Further, crafting process may also require a predefined number of XP points (52) and trade coins and predetermined time-period. The time-period for crafting the tokens reduces by increasing the number of the trade coins in the said crafting.

In the exemplary embodiment of the present invention, if 10 XP points (52) are needed for crafting a rare token, then it can be achieved using any combination ranging between using 10 tokens of 1 XP point or 1 token with 10 XP points.

In the embodiment of the present invention, fee is paid as trade coins with each crafting transaction which is necessary to facilitate the crafting.

The "trade coins" as mentioned herein are "in-game currency" that are given to the users on the completion of a successful trade (both the buyer and seller will receive this). These trade coins cannot be bought with real money, converted to real money or given to any other user.

In the exemplary embodiment of the present invention, crafting would only be possible with trade coins. For example, crafting a rare token may need 2 trade coins, and the like.

In one embodiment of the present invention, each crafting may require a certain amount of time for completion. Higher the standard attribute of the token (100) being crafted, higher the amount of time it will take.

In the embodiment of the present invention, additional trade coins may be required to complete a trade, or to speed up the crafting process.

In the exemplary embodiment of the present invention, to craft a rare token minimum 2 trade coins needed which would take 1 days, 3 trade coins would take 18 hours, 4 trade coins would 12 hours, and by using 5 trade coins the users may craft the token (100) instantly. This is just an example, and may use other technique also.

In one embodiment of the present invention, the trade coins may apply at the beginning of the crafting to speed up the said crafting. In another embodiment of the present invention, the trade coins may apply at the during the crafting to speed up the said crafting.

In one the present invention, the users may have limited crafting slots (for e.g., only one token (100) can be crafted at a time).

In another exemplary embodiment of the present invention, the users may craft more than one token (100) at a time.

In the embodiment of the present invention, the output of the crafting may yield one token irrespective of how many tokens are used for crafting.

In the exemplary embodiment of the present invention, the crafted tokens may carry 1 XP point after crafting, and the said XP points (52) may update as the tokens may participate in the fantasy game.

In one embodiment of the present invention, the crafted token may not carry any ongoing-sporting event information, as the crafted token is not tied to any real-world sporting event.

More specifically, as multiple tokens (100) may be used in the crafting from across different sporting events/matches and with different dynamic attributes, hence the tokens created by crafting won't contain any In-match information or performance-based attributes. The crafted token would therefore not showcase any player statistics.

In the embodiment of the present invention, instead of statistics of the player, the users may be able to see the history of the crafted token—i.e., the tokens used/burnt to create the crafted token by clicking on an icon below the token.

In the embodiment of the present invention, each crafted token has a unique hash/id that helps to distinguish the crafted tokens and map it to the users.

In one embodiment of the present invention, the tokens (100) which are used in the crafting, may allowed to remove from the system (1000) and would cease to exist but the crafting history should be showcased on each crafted token.

In the embodiment of the present invention, as these tokens used in the process cease to exist, the number of copies in circulation for the same would reduce. Information regarding the tokens currently in circulation will be provided to the users.

At step (520), the method (500) further includes allowing the users to select the said tokens (100) from at least one of the traded tokens, bundles, or the crafted tokens via a fantasy team generator module (422) to create a personalized fantasy team for playing the fantasy game.

In another embodiment of the present invention, the users are allowed to select the tokens which were traded in the previous sporting event.

In the embodiment of the present invention, the users are allowed to select predefined number of tokens to create the said fantasy team.

Figure 9:
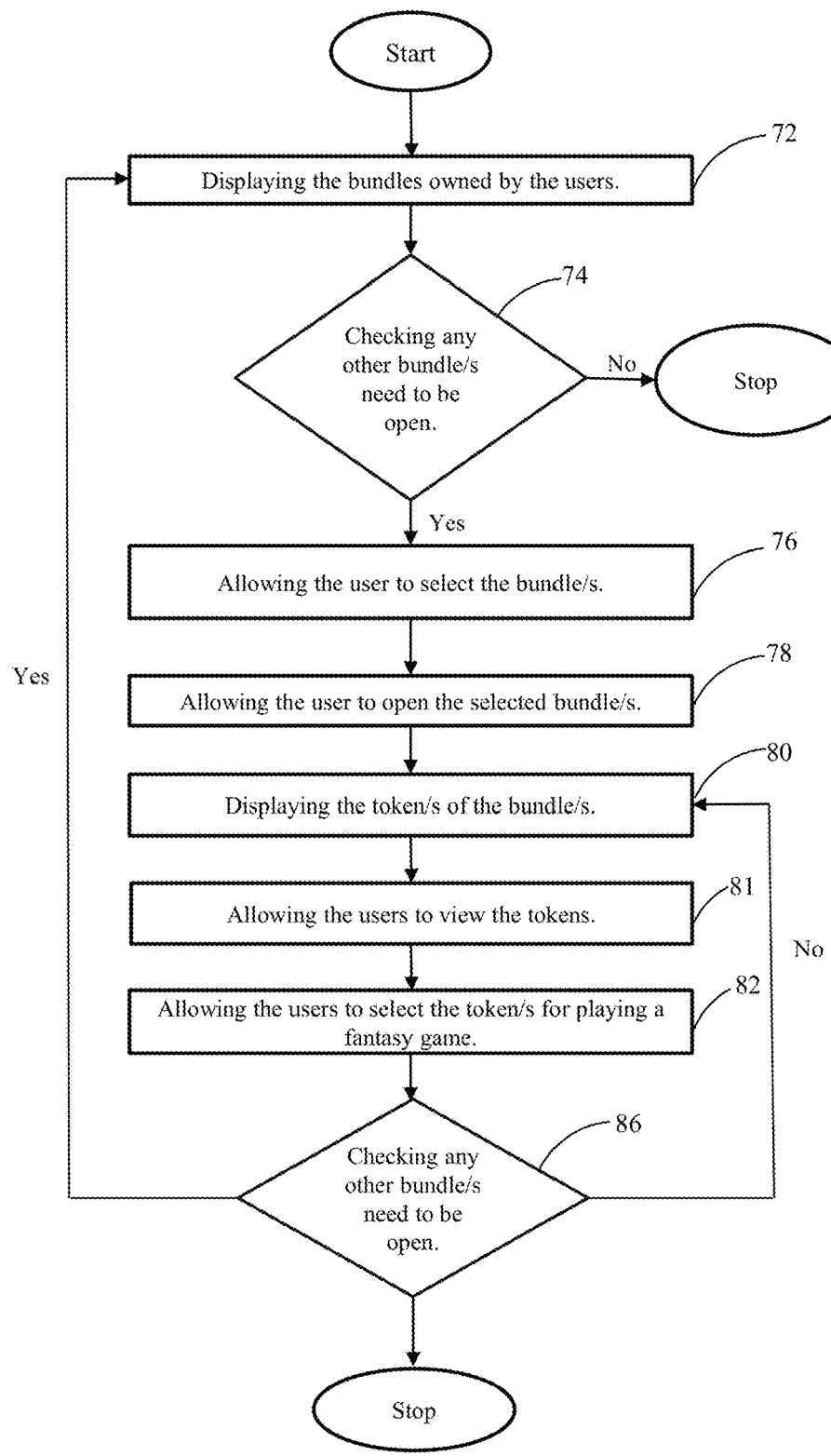
FIG. 9 illustrates an exemplary flowchart representing a process for opening the bundles of the non-fungible digital tokens of FIG. 3 for playing the fantasy game, according to various embodiments of the present invention.

In one embodiment of the present invention, the selection of the tokens (100) from the bundle/s including the steps as show in flowchart of FIGS. 8 & 9, which is now explained.

In the said selection method, at step (62), a predefined number of the bundles are released for the users for a predetermined time before the beginning of the real-world event (Refer FIG. 8B).

In the embodiment of the present invention, releasing time of the bundle/s is showcased before the beginning of the sporting event (Refer FIG. 8A).

In the embodiment of the present invention, in order to create a sense of urgency and build excitement with people rushing to a fantasy platform to purchase and get hands on the bundles, the number of the bundles are kept less than the number of the registered users. The bundles are also kept as the cheapest source of getting the non-fungible tokens (100).

Further, at step (64), the selection method allows the users are allowed to check the limit of the bundle/s they can purchase, thereafter, the users are allowed to select the bundle/s they want to purchase, at step (66) (Refer FIG. 8).

In the exemplary embodiment of the present invention, the said bundles, or the tokens (100) are purchased by real money.

After that, at step (68), the users are allowed to check the availability of the selected bundle/s.

In the said embodiment of the present invention, if the said selected bundle/s are fully available for the users, then the users are simply allowed to purchase the said bundle/s at step (70*a*) (Refer FIGS. 8 & 8C).

In one embodiment of the present invention, if the said selected bundle/s are partially available for the users, the users are simply allowed to purchase the available bundle/s at step (70*b*) (Refer FIG. 8).

In the said embodiment of the present invention, if the users do not want to purchase the said available bundle/s, the users are allowed to again select any other bundle/s i.e.—to follow the step (66) (Refer FIG. 8).

Coming back to step (68), if the said selected bundle/s are not available for the users, the users are allowed to check the availability for any other bundle/s as shown in step (70*c*) (Refer FIG. 8).

In the said embodiment of the present invention, if there is availability of the any other bundle/s, the users are allowed to follow step (66), and accordingly, allowed to select any other bundle/s they want to purchase.

In one embodiment of the present invention, referring to FIG. 9, the purchased bundles are displayed to the users owing the said bundles, at step (72).

Thereafter, at step (74), the method (500) involves checking any other bundle/s need to be displayed.

Figure 8D:
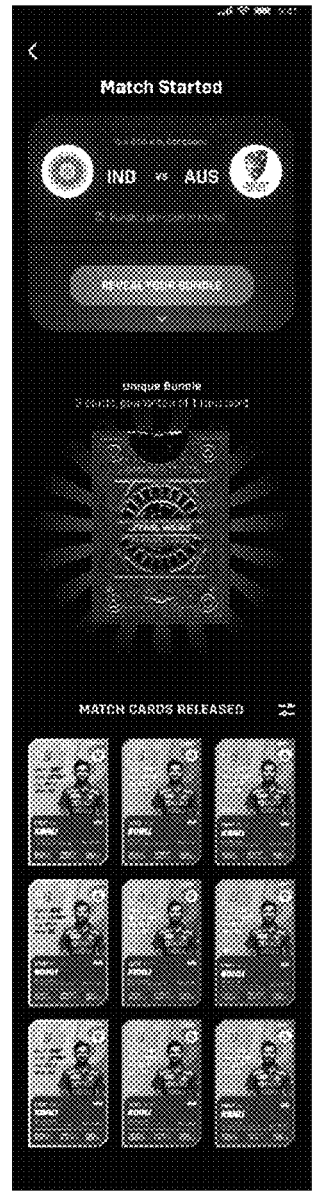

Further, at step (76), the users are allowed to select the bundle/s to open, and accordingly, allowing the users to open the said bundle/s, at step (78) (Refer FIG. 8D).

In the exemplary embodiment of the present invention, the users are allowed to open the said bundle/s after 2 minutes of starting of the real-world sporting event.

In one embodiment of the present invention, the users are allowed to open the said bundle/s.

Figure 8E:
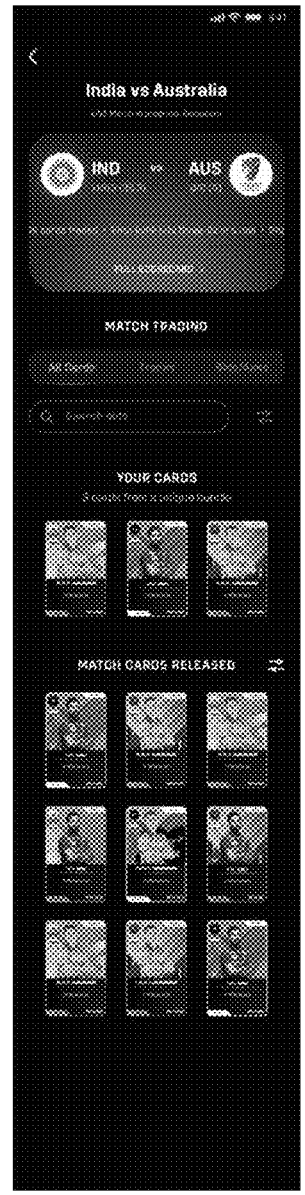

Again, referring to FIGS. 9 & 10A, at step (80), the tokens (100) of the bundle/s are displayed to the users, and subsequently, at step (81), the users are allowed to view the tokens for viewing the multiple attributes of the said tokens (100) (Refer FIG. 8E).

Thereafter, at step (82), the users are allowed to select the said tokens (100) to create the personalized fantasy team via the fantasy team generator module (422).

In another embodiment of the present invention, tokens received from the bundles are allowed to use in the fantasy game of the subsequent sporting events.

In another embodiment of the present invention, at step (86), the users are allowed to check that any further bundle/s need to be open or not. (Refer FIG. 8E).

Referring to FIG. 2, at step (522) of method (500), the users are allowed to compete in the fantasy game to play the said fantasy game to establish a winner amongst themselves based on the performance of the fantasy team in the real-world sporting event.

Figure 10A:
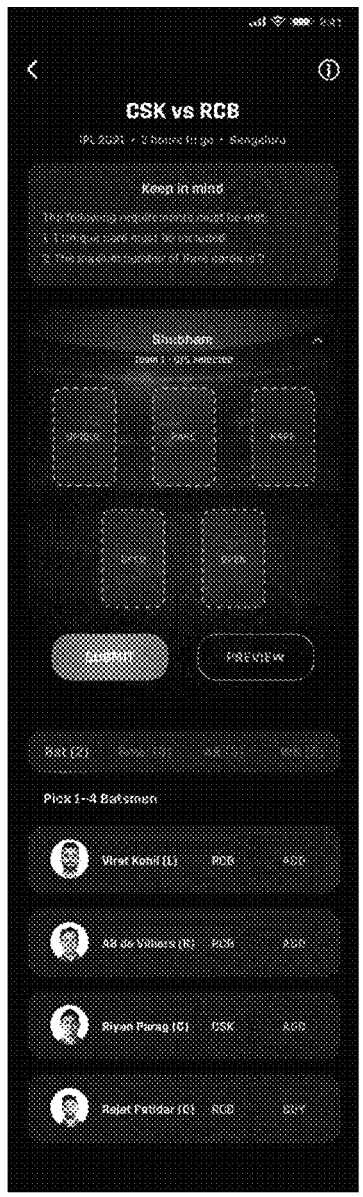
FIG. 10A illustrates snapshot representing creating of a personalized fantasy team for playing the fantasy game, according to various embodiments of the present invention.
Figure 10B:
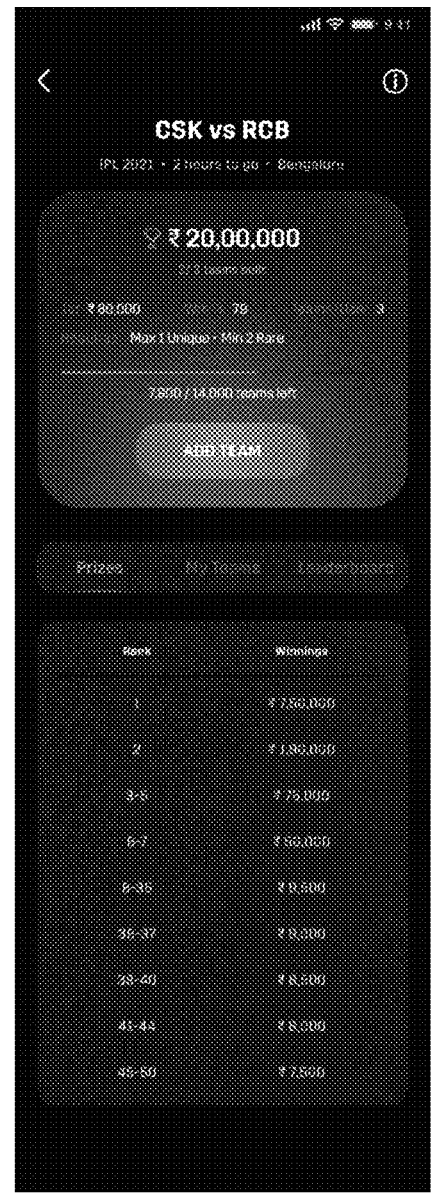
FIG. 10B illustrates snapshot representing adding of the personalized fantasy team of FIG. 10A for playing the fantasy game, according to various embodiments of the present invention.

In the embodiment of the present invention, the users are allowed to add their personalized fantasy team in the events/contents in which the users want to participate (Refer to FIG. 10B).

In the exemplary embodiment of the present invention, the involvement of the users in playing the fantasy team is limited to creating the best personalized fantasy teams and adding the said teams in the contests/events. In one exemplary embodiment of the present invention, the users may be allowed to participate in each of the said contests/events with more than 1 fantasy team.

In the embodiment of the present invention, while playing in the fantasy game, the fantasy team of the users collect fantasy points based on the performance of the players in the real-world sporting event.

Thereafter, a winner/list of winners is decided based on the performance of the real-world sporting players in the real-world sporting event.

In the exemplary embodiment of the present invention, completed sporting events of the user, and prize won by the said user may also be shown. (Refer to FIG. 11A).

In the exemplary embodiment of the present invention, the winning prizes may include but not limited to cash prizes, tokens, and reward points.

Figure 11A:
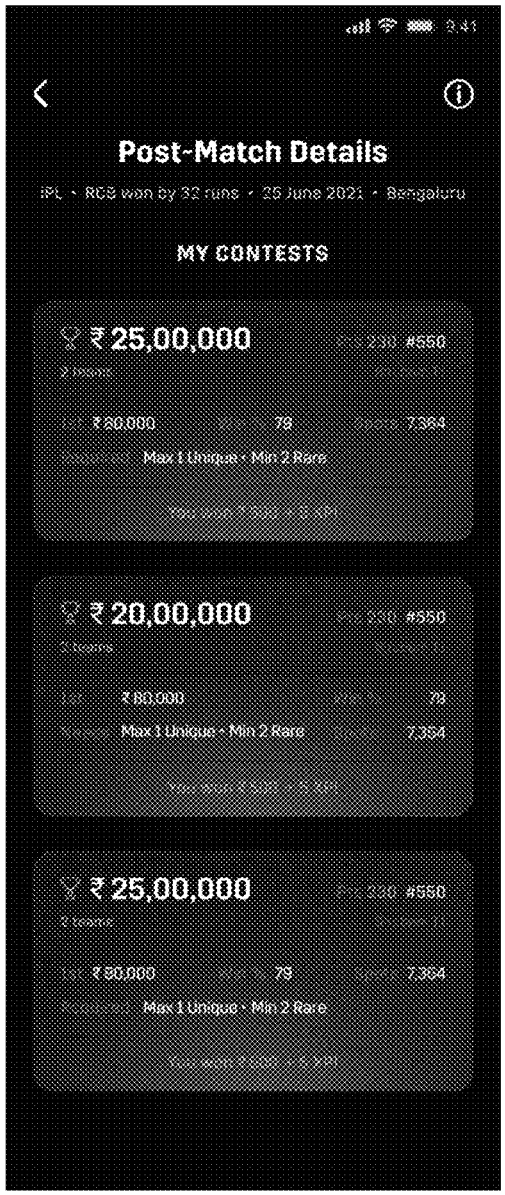
FIG. 11A illustrates snapshot representing real-world sporting events of the users after the completion of the sporting events along the wining prizes, according to various embodiments of the present invention.
Figure 11B:
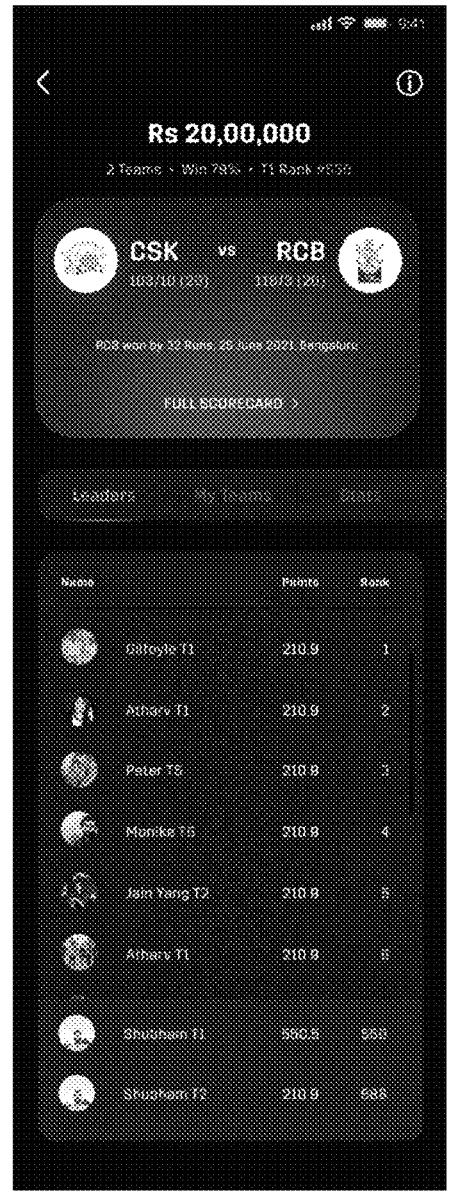
FIG. 11B illustrates snapshot representing leaderboard based on the ranking after the completion of the sporting events along the wining prizes, according to various embodiments of the present invention.

In another exemplary embodiment of the present invention, referring to FIG. 11B, a fantasy leaderboard board is shown in which the users are listed according to the ranking of the users based on the earned fantasy points on the said fantasy game.

In this manner, the said computer implemented method (500) allows plurality of users to play a fantasy game employing non-fungible tokens (100).

In another aspect of the present invention, the users may also be allowed to craft the plurality of non-fungible tokens (100) for playing fantasy game.

ADVANTAGES OF THE INVENTION

In the various embodiments of the present invention, the users may have non-fungible digital special tokens (rare tokens or epic tokens) (100) in the bundles before the beginning of the real-world sporting event, thereby, allowing the users to purchase the said bundles, and create the best possible team to play the fantasy game. This may increase the chances for the users to win the said fantasy game.

Further, in the present invention, the users may sell their tokens (100) at a price higher than the price they had purchased before (this depends on the performance of the sporting players in the real-world sporting event).

Furthermore, in the present invention, the users may also trade their tokens before the sporting event, during the in-going sporting event, or after the completion of the sporting event.

More specifically, during the in-going sporting event, if players of the users are not performing, then the users may buy the tokens (100) of the players during the in-going sporting event.

In addition, the users may also convert their tokens (100) of lower rarity to the tokens (100) of higher rarity by crafting, and may play the said fantasy game. The crafted tokens enable the users to earn more points which may increase the chances for the users to win the said fantasy game.

In nutshell, the fantasy gaming system and computed-implemented method of the present invention overcome the above-discussed drawbacks which are discussed in the background of the invention and provide easy to operate and cost-effective method and system for playing the fantasy game using non-fungible digital tokens.

The method, as described in the disclosed teachings or any of its components, may be embodied in the form of a computer implemented method. Typical examples of a computer included in the computer implemented method include a general-purpose computer, a PDA, a cell phone, a programmed microprocessor, a microcontroller, a peripheral integrated circuit element, and other devices or arrangements of devices that are capable of implementing the steps that constitute the method of the disclosed teachings.

In a computer implemented method using a general-purpose computer, such a general-purpose computer can include an input device such as keyboard, a mouse, a trackball, a touchpad, a microphone, or a camera. The computer can include a display unit, such as a projector, a monitor, or a touch screen. A touch screen can also be used as an input device. Specifically, the computer of the computer implemented method can comprise a hardware microprocessor, where the microprocessor is connected to a communication bus.

The computer implemented method can also include a memory; the memory can include Random Access Memory (RAM) and Read Only Memory (ROM).

The computer of the computer implemented method can further comprise a non-transitory computer readable medium such as a storage device, which can be a hard disk drive or a removable storage drive such as a flash drive, optical disk drive, and the like. The storage device can also comprise other similar means for loading computer programs or other instructions into the computer of the computer implemented method.

The computer of the computer implemented method may comprise a communication device to communicate with a remote computer through a network. The communication device can include a wireless communication port, a data cable connecting the computer of the computer implemented method with the network, or the like. The network can be a Local Area Network (LAN) or a Wide Area Network (WAN) such as the Internet and the like.

The remote computer that is connected to the network can be a general-purpose computer, a server, a PDA, and the like. Further, the computer of the computer implemented method can access information from the remote computer through the network.

The sets of instructions stored on the computer readable medium which include various commands that instruct the computer of the computer implemented method to perform specific tasks such as the steps that comprise the methods of the disclosed teachings.

The sets of instructions may be embodied in the form of a transitory medium, such as a software program.

The software may be in various forms such as method software or application software. Further, the software might be in the form of a collection of separate programs, a program module with a larger program or a portion of a program module. The software might also include modular programming in the form of object-oriented programming.

The software program or programs may be provided as a computer program product, such as in the form of a computer readable medium with the program or programs containing the set of instructions embodied therein. The processing of input data by the computer of the computer implemented method may be in response to user commands or in response to the results of previous processing or in response to a request made by another computer.

The foregoing descriptions of specific embodiments of the present invention have been presented for purposes of description. They are not intended to be exhaustive or to limit the present invention to the precise forms disclosed, and obviously many modifications and variations are possible in light of the above teaching.

Further, the embodiments were chosen and described in order to best explain the principles of the present invention and its practical application, and thereby enable others skilled in the art to best utilize the present invention and various embodiments with various modifications as are suited to the particular use contemplated.

It is understood that various omissions and substitutions of equivalents are contemplated as circumstances may suggest or render expedient, but such omissions and substitutions are intended to cover the application or implementation without departing from the spirit or scope of the present invention.

We claim:

1. A system for allowing a plurality of the users to trade and craft non-fungible digital tokens or NFTs, and allowing the said plurality of users to play a fantasy game using the said non-fungible digital tokens over a computer network, wherein the non-fungible digital tokens represent real world sporting players involved in a real-world sporting event, the system comprising:
    a blockchain network comprising a register for storing information related to the said plurality of non-fungible digital tokens;
    a minting module configured to mint the said plurality of non-fungible tokens;
    a bundle generator module configured to the said blockchain network, the said bundle generator module configured to generate bundles of the said plurality of non-fungible digital minted tokens, each of the bundles comprising a predetermined number of the said non-fungible digital minted tokens of different rarity, wherein the rarity signifies number of times the non-fungible digital token has been minted; and
    a computing device comprising,
        a fantasy game application configured to the said blockchain network and the bundle generator module, the said application comprising,
            a registration module configured to register a plurality of users,
            a user interface module configured to display the plurality of minted non-fungible digital tokens,
            a trading module configured to facilitate the plurality of the users to trade the said tokens, and
            a fantasy team generator module configured to facilitate each of the users to,
                select the plurality of the minted tokens from at least one of the traded tokens or the said bundles to create a personalized fantasy team, and
                play the said fantasy game to establish a winner amongst themselves, the winner being decided based on the performance of the fantasy team in the said real world sporting event.

2. The system as claimed in claim 1, wherein the trading module configured to facilitate the plurality of the users to,
    buy the said non-fungible tokens for collecting and registering the ownership of the said non-fungible tokens, and
    sell the said non-fungible tokens, wherein a value of the said tokens depending upon various factors such as standard attributes of the tokens, performance of the players, rarity of the tokens, or the like.

3. The system as claimed in claim 2, wherein the users are allowed to buy the said tokens at an ask price or placed bid.

4. The system as claimed in claim 2, wherein the users are allowed to sell the said tokens by setting the ask price or by accepting the placed bid.

5. The system claimed in claim 1, wherein selection of the non-fungible tokens from the bundles comprises,
releasing a predefined number of the bundles for the users for a predetermined time before the beginning of the real-world sporting event, and
allowing the registered users to buy the said bundle before the beginning of the real-world sporting event.

6. The system as claimed in claim 5, wherein the tokens received from the said bundles are used in the fantasy games of the subsequent sporting events.

7. The system as claimed in claim 1 comprising a crafting module configured to facilitate the plurality of the users to craft/create the non-fungible tokens of higher rarity using the non-fungible tokens of lower rarity, wherein the said crafted tokens are used to play the said fantasy game.

8. A computed-implemented method for allowing a plurality of users to trade and craft non-fungible digital tokens or NFTs, and allowing the said plurality of users to play a fantasy game using the said non-fungible digital tokens over a computer network, wherein the said non-fungible digital tokens represent real world sporting players involved in a real-world sporting event, the method comprising:
minting a plurality of non-fungible digital tokens, the said tokens being stored in a blockchain network comprising a register for storing information related to the said plurality of non-fungible digital tokens;
generating bundles of the said plurality of non-fungible digital tokens via a bundle generator module, each of the bundles comprising a predetermined number of the said non-fungible digital tokens of different rarity, wherein the rarity signifies number of times the non-fungible digital token has been minted;
registering a plurality of users of the fantasy game via a registration module;
displaying the plurality of minted non-fungible digital tokens to the users;
allowing the users to,
trade the plurality of non-fungible digital tokens, and select the tokens from at least one of the traded tokens or the said bundles to create a personalized fantasy team via a fantasy team generator module; and
allowing the users to compete in the said fantasy game to establish a winner amongst themselves, the winner being decided based on the performance of the real-world sporting players in the real-world sporting event.

9. The method as claimed in claim 8, wherein the plurality of non-fungible tokens is associated with experience points (XP) points based on the participation of the tokens in the real-world sporting event, the said (XP) points being updated on the said tokens after the completion of the said real world sporting event.

10. The method as claimed in claim 8, wherein the said tokens comprise information including an image of a player, statistical characteristics of the player, standard attribute of the tokens, ownership of the said tokens, unique serial number of the tokens, or the like.

11. The method as claimed in claim 8, wherein the standard attributes of the plurality of non-fungible tokens comprise a rarity attribute associated with each of the plurality of the non-fungible tokens, wherein the rarity attribute of the tokens comprises tokens of multiple rarity including common tokens, rare tokens, unique/epic tokens, genesis tokens, legendary tokens, the rarity of the tokens is based on the number of mints of the particular player's token.

12. The method as claimed in claim 8, wherein selecting of the non-fungible tokens from the bundles comprises,
releasing a predefined number of the bundles for the users for a predetermined time before the beginning of the real-world sporting event, and
allowing the registered users to buy the said bundle before the beginning of the real-world sporting event.

13. The method as claimed in claim 12, wherein the tokens received from the said bundles are used in the fantasy games of the subsequent sporting events.

14. The method as claimed in claim 11, wherein the rarity of the tokens in the said bundles comprises at least one of common tokens, rare tokens, or epic tokens.

15. The method as claimed in claim 8 comprising collecting fantasy points based on performance of the players of the fantasy team in the real-world sporting event, wherein the user having the fantasy team with most collected points is decided to be the winner of the said fantasy game.

16. The method as claimed in claim 8 comprising trading the said plurality of non-fungible digital tokens before, during, or after the completion of the sporting event via a trading module, wherein the trading of the said tokens comprises auctioning of the said tokens.

17. The method as claimed in claim 12 comprising allowing the users to set an ask price or accept the placed bid to sell the said plurality of non-fungible digital tokens.

18. The method as claimed in claim 12 comprising allowing the users to place a bid to buy the said plurality of non-fungible digital tokens.

19. The method as claimed in claim 8, wherein value of the said plurality of non-fungible tokens depends upon a plurality of factors including standard attributes of the non-fungible digital tokens, performance characteristics of the players, or the like.

20. The method as claimed in claim 8 comprising allowing the users to craft the plurality of non-fungible tokens, wherein crafting of the plurality of non-fungible tokens comprises converting lower rarity token/s to that of higher rarity via a crafting module using a set of predetermined rules.

21. The method as claimed in claim 20, wherein the predetermined rules comprise converting non-fungible token/s of a particular player with a lower rarity to craft a non-fungible token of higher rarity of that particular player.

22. The method as claimed in claim 8, wherein each of plurality of the non-fungible digital tokens comprises:
a plurality of fixed attributes comprising player metadata, sporting event metadata, cumulative career statistics, unique serial number of the token, fixed milestones, or the like,
a plurality of dynamic attributes comprising XP points of the player, in-game scores, dynamic milestones, or the like.

23. A computed-implemented method for allowing a plurality of users to play to trade and craft non-fungible digital tokens or NFTs, and allowing the said plurality of users a fantasy game using the said non-fungible digital tokens over a computer network, wherein the said non-fungible digital tokens represent real world sporting players involved in a real-world sporting event, the method comprising:

minting a plurality of non-fungible digital tokens, the said tokens being stored in a blockchain network comprising a register for storing information related to the said plurality of non-fungible digital tokens;

registering a plurality of users of the fantasy game via a registration module;

allowing the users to craft the plurality of non-fungible tokens, wherein crafting of the plurality of non-fungible tokens comprises converting lower rarity token/s to that of higher rarity via a crafting module using a set of predetermined rules;

allowing the users to select the tokens from the said crafted tokens to create a personalized fantasy team via a fantasy team generator module; and allowing the users to play the said fantasy game to establish a winner amongst themselves based on the performance of the fantasy team in the real-world sporting event.

24. The method as claimed in claim 23, wherein the predetermined rules comprise converting non-fungible token/s of a particular player with a lower rarity to craft a non-fungible token of higher rarity of that particular player.

25. The method as claimed in claim 24, wherein the non-fungible crafted tokens comprise tokens of multiple rarity including common tokens, rare tokens, unique/epic tokens, genesis tokens, legendary tokens, wherein the rarity of the said tokens is arranged in the order respectively.

26. The method as claimed in claim 24, wherein a predefined number of XP points and trade coins and predetermined time-period are required to craft the said non-fungible tokens, wherein the time-period for crafting the tokens reduces by increasing the number of the trade coins in the said crafting.

27. The method as claimed in claim 23 comprising generating bundles of the said plurality of non-fungible digital tokens via a bundle generator module, each of the bundles comprising a predetermined number of the said non-fungible digital tokens of different rarity.

28. The method as claimed in claim 27, wherein the said tokens are selected from the said bundles to create the personalized fantasy team to play the said fantasy game.

29. The method as claimed in claim 28, wherein selecting of the non-fungible tokens from the bundles comprises,
 releasing a predefined number of the bundles for the users for a predetermined time before the beginning of the real-world sporting event, and
 allowing the registered users to buy the said bundle before the beginning of the real-world sporting event.

30. The method as claimed in claim 23 comprising trading the said plurality of non-fungible digital tokens during, or after the completion of the sporting event via a trading module, wherein the trading of the said tokens comprises auctioning of the said tokens, and the said traded tokens are used to play the said fantasy game.

* * * * *